US005699328A

United States Patent [19]

Ishizaki et al.

[11] Patent Number: 5,699,328

[45] Date of Patent: Dec. 16, 1997

[54] AUTOMATIC VENDING MACHINE FOR VENDING INFORMATION TRANSMITTED FROM SATELLITE

[75] Inventors: Masayuki Ishizaki; Kazuo Satoh; Yoshimasa Kadooka; Mariko Hayakawa; Tetsuo Urushihara, all of Kawasaki, Japan

[73] Assignee: Fujitsu Limited, Kanagawa, Japan

[21] Appl. No.: 427,487

[22] Filed: Apr. 24, 1995

Related U.S. Application Data

[63] Continuation of Ser. No. 253,235, Jun. 2, 1994, abandoned, which is a continuation of Ser. No. 954,651, Sep. 30, 1992, abandoned.

[30] Foreign Application Priority Data

Sep. 30, 1991 [JP] Japan .................................... 3-251446

[51] Int. Cl.$^{6}$ ............................. G11B 19/00; G06F 17/00

[52] U.S. Cl. ................. 369/24; 340/825.35; 364/479.01; 235/381

[58] Field of Search .................. 369/24, 30; 340/825.35, 340/825.15, 825.72; 235/381, 382, 382.5; 455/3.2, 12; 358/86; 364/479, 479.01–479.08

[56] References Cited

U.S. PATENT DOCUMENTS

| | | | |
|---|---|---|---|
| 3,956,615 | 5/1976 | Anderson et al. | 235/381 |
| 4,528,643 | 7/1985 | Freeny, Jr. | 364/900 |
| 4,654,799 | 3/1987 | Ogaki et al. | 364/479 |
| 4,674,055 | 6/1987 | Ogaki et al. | 364/479 |
| 4,787,050 | 11/1988 | Suzuki | 364/479 |
| 4,857,714 | 8/1989 | Sunyich | 235/381 |
| 5,091,713 | 2/1992 | Horne et al. | 235/381 |
| 5,113,351 | 5/1992 | Bostic | 340/825.35 |
| 5,151,782 | 9/1992 | Ferraro | 358/86 |

FOREIGN PATENT DOCUMENTS

| | | |
|---|---|---|
| 390611 | 10/1990 | European Pat. Off. . |
| 2657187 | 7/1991 | France . |
| 57-16838 | 10/1982 | Japan . |
| 58-16306 | 9/1983 | Japan . |
| 59-100968 | 9/1984 | Japan . |
| 59-22967 | 12/1984 | Japan . |
| 62-7419 | 4/1987 | Japan . |
| 63-83478 | 10/1989 | Japan . |
| 2-96270 | 4/1990 | Japan . |
| 0223429 | 9/1990 | Japan . |

*Primary Examiner*—Tan Dinh

*Attorney, Agent, or Firm*—Helfgott & Karas, P.C.

[57] ABSTRACT

An automatic vending machine for vending information, containing: a receiving unit for receiving a signal carrying first information transmitted from a satellite; a storage unit for storing the first information; a buying request input unit for receiving a request for buying the information; a charge receiving unit for receiving a charge for the first information; and an information output unit for reading the first information requested by the request from the storage unit and outputting the first information when the request and the charge is received.

24 Claims, 35 Drawing Sheets

Fig. 5

| INFO CODE | IP CODE | DATA CODE | WRITTEN TIME & DATE | TITLE | AUTHOR |
|---|---|---|---|---|---|
| 01 | 001 | 110020 | 91.05.03 | XXXXXXX XXXX | — |
| | | 110021 | 91.05.03 | YYYY YYYYY YYYYYY YYYYY | |
| | | | | ⋮ | |
| 02 | 121 | 213010 | 91.04.29 | ZZZZZ ZZZZZ ZZZZZZ ZZZ | |
| | | 213011 | 91.04.30 | WWWWW WWW WWWWWW WWWWWW | |
| | | | | ⋮ | |

FROM STEP 205 IN FIG. 20A
SELECT DATA CAPACITY OF MEMO-RY CARD
206
FROM STEP 207 IN FIG. 20A
SELECT DATA CAPACITY OF FLOPPY DISC
208
FROM STEP 202 IN FIG. 20A
TAKE ONE PIECE OF STORAGE MEDIUM OUT OF STOCKED PIECES
209
SET STORAGE MEDIUM TO BE WRITTEN IN
210
CALCULATE PRICE OF USED STORAGE MEDIUM
211
SALES ACOUNT INFORMATION PROCESSING
212
END

AUTOMATIC VENDING MACHINE FOR VENDING INFORMATION TRANSMITTED FROM SATELLITE

This is a continuation of application Ser. No. 08/253,235, filed Jun. 2, 1994, abandoned, which is a continuation of application Ser. No. 07/954,651, filed Sep. 30, 1992 abandoned.

BACKGROUND OF THE INVENTION (1) Field of the Invention

The present invention relates to an automatic vending machine for vending information, such as information in a newspaper, a magazine, and the like.

(2) Description of the Related Art

Conventionally, information in a newspaper or a magazine is distributed to people after being printed on paper. Therefore, a large amount of paper is used for distributing the information. However, consuming a large Mount of paper results in consuming a large amount of wood resources on the earth, and causes a heavy load on traffic and transportation systems. Thus, it is desirable for the information in newspapers and magazines to be distributed to people without using paper.

SUMMARY OF THE INVENTION

An object of the present invention is to provide an automatic vending machine for vending information without paper.

According to the present invention, there is provided an automatic vending machine for vending information, containing: a receiving unit for receiving a signal carrying first information transmitted from a satellite; a storage unit for storing the first information; a buying request input unit for receiving a request for buying the information; a charge receiving unit for receiving a charge for the first information; and an information output unit for reading the first information requested by the request from the storage unit and outputting the first information when the request and the charge is received.

The construction of the present invention, can further comprise any of the following additional features (a) to (t).

(a) The above first information received by the receiving unit includes a plurality of predetermined kinds of second information and third information accompanying each kind of second information and indicating the kind. The storage unit contains a plurality of areas respectively storing different kinds of the second information. The buying request input unit comprises, a content indicating unit for indicating the different kinds of the second information stored in the storage unit, and a kind input unit for inputting fourth information indicating one of the different kinds. The charge receiving unit receives the charge corresponding to the fourth information. The information output unit reads from the storage unit the second information corresponding to the fourth information which is input, and outputs the second information when the charge corresponding to the fourth information is received.

(b) The automatic vending machine further comprises an output information informing unit for transmitting output information on the outputting operation of the information output unit after the information output unit outputs the information.

(c) The above signal is modulated and scrambled. The receiving unit comprises, a receiving antenna for receiving the signal transmitted from the satellite, a demodulating unit for demodulating the modulated and scrambled signal received by the receiving antenna to obtain a scrambled signal, and a descrambling unit for descrambling the scrambled signal.

(d) The automatic vending machine further comprises, a box on which the receiving antenna is mounted so that an orientation of the receiving antenna is adjustable, and the box containing components of the automatic vending machine other than the receiving antenna; and a received signal level measuring unit for measuring a strength of the received signal.

(e) In addition to the additional feature of (a), the information output unit comprises, a storage medium receiving unit for receiving a piece of storage medium which is inserted therein, and a writing unit for reading the information requested by the request from the storage unit and writing the information in the piece of storage medium received in the storage medium receiving unit.

(f) In addition to the additional feature of (a), the first information includes fifth information accompanying each kind of second information and indicating a version of the kind of second information. The storage unit comprises: a unit for determining whether or not a predetermined kind of second information is written in the storage unit; a received version reading unit for reading the fifth information accompanying the predetermined kind of second information which is newly received by the receiving unit when the second and fifth information is newly received; a stored version reading unit for reading the fifth information accompanying the predetermined kind of second information which is stored in the storage unit; a version comparing unit for determining whether or not the version indicated by the fifth information read by the received version reading unit is newer than the version indicated by the fifth information read by the stored version reading unit; and a rewriting unit for rewriting the predetermined kind of second information together with the accompanying fifth information stored in the storage unit, with the predetermined kind of second information together with the accompanying fifth information newly received by the receiving unit, when the fourth unit determined that the version indicated by the fifth information read by the stored version reading unit is newer than the version indicated by the fifth information read by the stored version reading unit.

(g) In addition to the additional feature of (e), the first information includes fifth information accompanying each kind of second information and indicating a version of the kind of second information. The information output unit further comprises: a unit for determining whether or not a predetermined kind of second information is written in the piece of storage medium inserted in the storage medium receiving unit when the predetermined kind of second information is requested by the kind input unit; a storage medium version reading unit for reading the fifth information accompanying the predetermined kind of second information which is written in the piece of storage medium inserted in the storage medium receiving unit; a stored version reading unit for reading the fifth information accompanying the predetermined kind of second information which is stored in the storage unit; a version comparing unit for determining whether or not the version indicated by the fifth information read by the storage medium version reading unit is older than the version indicated by the fifth information read by the stored version reading unit; and a rewriting unit for rewriting the predetermined kind of second information together with the accompanying fifth information stored in the piece of storage medium, with the predetermined kind of second information together with the accompanying fifth information stored in the storage unit, when the fourth unit determined that the version indicated by the fifth information read by the storage medium version reading is older than the version indicated by the fifth information read by the stored version reading unit.

(h) In addition to the additional feature of (g), the information output unit further comprises, a unit for indicating a current time, a unit for determining whether or not the current time is within a period predetermined for a predetermined kind of second information when the predetermined kind of second information is requested by the kind input unit.

(i) The information output unit comprises, a storage medium stock unit for stocking at least one piece of storage medium, an internal storage medium writing unit for reading the information requested by the request from the storage unit and writing the information in one of the at least one piece of storage medium stocked in the storage medium stock unit, and a written storage medium output unit for outputting the piece of storage medium after the information is written in the piece of storage medium.

(j) The information output unit comprises a storage medium receiving unit for receiving a piece of storage medium which is inserted thereto, a writing unit for reading the information requested by the request from the storage unit and writing the information in the piece of storage medium received in the storage medium receiving unit, a first written storage medium output unit for outputting the piece of storage medium after the information is written in the piece of storage medium, a storage medium stock unit for stocking at least one piece of storage medium, an internal storage medium writing unit for reading the information requested by the request from the storage unit and writing the information in one of the at least one piece of storage medium stocked in the storage medium stock unit, and a second written storage medium output unit for outputting the piece of storage medium after the information is written in the piece of storage medium. The buying request input unit comprises a storage medium selecting unit for selecting one of the piece of storage medium inserted into the storage medium receiving unit and the one of the at least one piece of storage medium stocked in the storage medium stock unit, as a piece of storage medium in which the information is to be written.

(k) In addition to the additional feature of (a), the automatic vending machine further comprises a dealing-allowed information registering unit for registering information indicating at least one kind of information which the automatic vending machine is allowed to deal with. The storage unit comprises a unit for determining whether or not the information received by the receiving unit is one of the at least one kind of information registered in the dealing-allowed information registering unit, and a limited storing unit for storing the information received by the receiving unit in the storage unit when the information received by the receiving unit is one of the at least one kind of information registered in the dealing-allowed information registering unit.

(l) The automatic vending machine comprises an abnormal situation detecting unit for detecting an occurrence of an abnormal situation in the automatic vending machine, and an abnormal situation transmitting unit for transmitting information on the occurrence of the abnormal situation.

(m) The buying request input unit comprises an operation timer unit for determining whether or not the operations of receiving the request and the charge are completed within a predetermined time, and an operation stoping unit for stopping the operation responding to the request, and initializing the automatic vending machine.

(n) The automatic vending machine further comprises, a box on which the receiving antenna is mounted so that an orientation of the receiving antenna is adjustable, where the box contains components of the automatic vending machine other than the receiving antenna; and a receiving strength output unit for outputting a signal indicating a strength of the received signal.

(o) The charge receiving unit comprises a cash receiving unit for receiving payment of the charge by cash, a credit card receiving unit for receiving payment of the charge by a credit card, and a prepaid card receiving unit for receiving payment of the charge by a prepaid card.

(p) In addition to the additional feature of (o), the credit card receiving unit comprises a reference communication unit for carrying out communication for making a reference for validity of the credit card, and an invalidity indicating unit for indicating invalidity of the credit card when the reference communication unit is informed of the invalidity of the credit card through the communication by the reference communication unit.

(q) In addition to the additional feature of (e), the storage medium receiving unit comprises a storage capacity determining unit for determining a vacant capacity of the piece of storage medium inserted in the storage medium receiving unit, and a storage capacity indicating unit for indicating the determined vacant capacity.

(r) In addition to the additional feature of (q), the storage medium receiving unit comprises: a storage capacity comparing unit for determining whether or not the vacant capacity determined by the storage capacity determining unit is enough to write all of the information requested by the request; and a capacity shortage indicating unit for indicating that the vacant capacity determined by the storage capacity determining unit is not enough to write all of the information requested by the request, and prompting an input for requesting to write the information in the inserted piece of storage medium and at least one additional piece of storage medium, or to buy other information to be written in the inserted piece of storage medium. The buying request input unit comprises a unit for receiving the input for requesting to write the information in the inserted piece of storage medium and at least one additional piece of storage medium. The information output unit comprises a write-in-sections unit for writing the requested information into a plurality of pieces of storage medium.

(s) In addition to the additional feature of (r), the write-in-sections unit comprises a storage medium change prompting unit for prompting for insertion of an additional piece of storage medium into the storage medium receiving unit when the storage capacity comparing unit determines that the vacant capacity determined by the storage capacity determining unit is not enough to write all of the information requested by the request.

(t) In addition to the additional feature of (e), the storage medium receiving unit comprises a storage medium inlet/outlet for inletting and outputting a piece of storage medium therethrough, a unit for drawing the piece of storage medium inward through the storage medium inlet/outlet when the piece of storage medium is inserted into the storage medium inlet/outlet, and a unit for pushing the piece of storage medium outward through the storage medium inlet/outlet after the information is written in the piece of storage medium.

BRIEF DESCRIPTION OF THE DRAWINGS

In the drawings:

FIG. 5 indicates an example content of an information management table in the embodiment of the present invention;

DESCRIPTION OF THE PREFERRED EMBODIMENTS

INFORMATION DELIVERY AND VENDING SYSTEM (FIG. 1)

Figure 1:
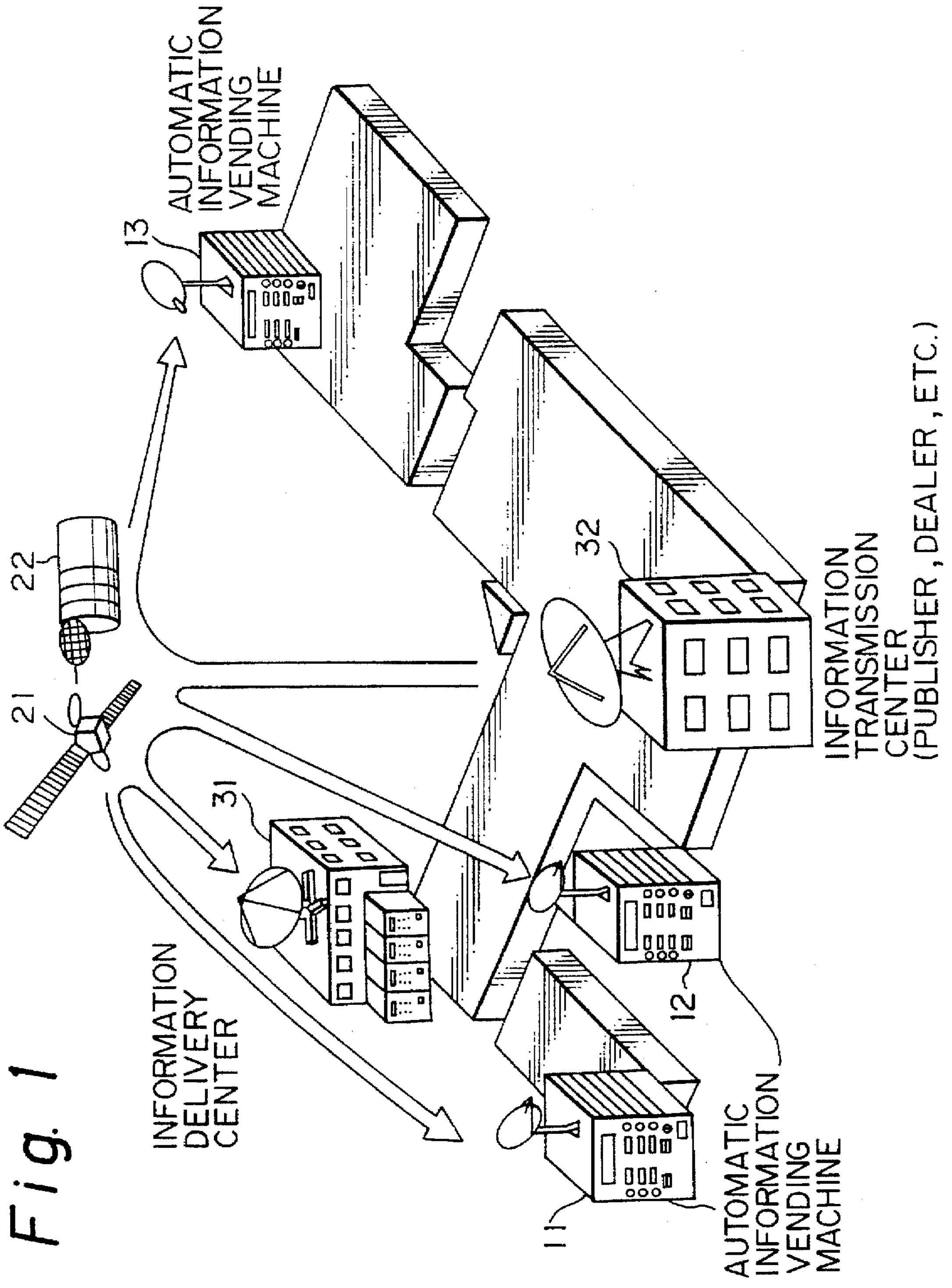
FIG. 1 illustrates an information delivering and vending system wherein the automatic information vending machine according to the present invention is used.

FIG. 1 illustrates an information delivering and vending system wherein the automatic information vending machine according to the present invention is used. In FIG. 1, reference numerals 11, 12, and 13 each denote an automatic information vending machine according to the present invention, 21 and 22 each denote a communications satellite, 31 and 32 each denote an information transmission center. Information to be commercially delivered to the customers (readers), such as contents of magazines, newspapers, and the like, are transmitted from the information transmission centers 31 and 32 to the communications satellite 21 or 22. The communications satellites 31 and 32 respectively receive the information transmitted from the information transmission centers 31 and 32, and then transmit the information transmit to the automatic information vending machines 11, 12, and 13. The automatic information vending machines 11, 12, and 13 are placed at predetermined places in various areas. According to the information delivering and vending system of FIG. 1, information is transmitted through the communications satellites to the customers in the form of electronic data, quickly and at low cost and without using the traffic and transportation systems.

EXTERNAL APPEARANCE OF AUTOMATIC INFORMATION VENDING MACHINE (FIG. 2)

Figure 2:
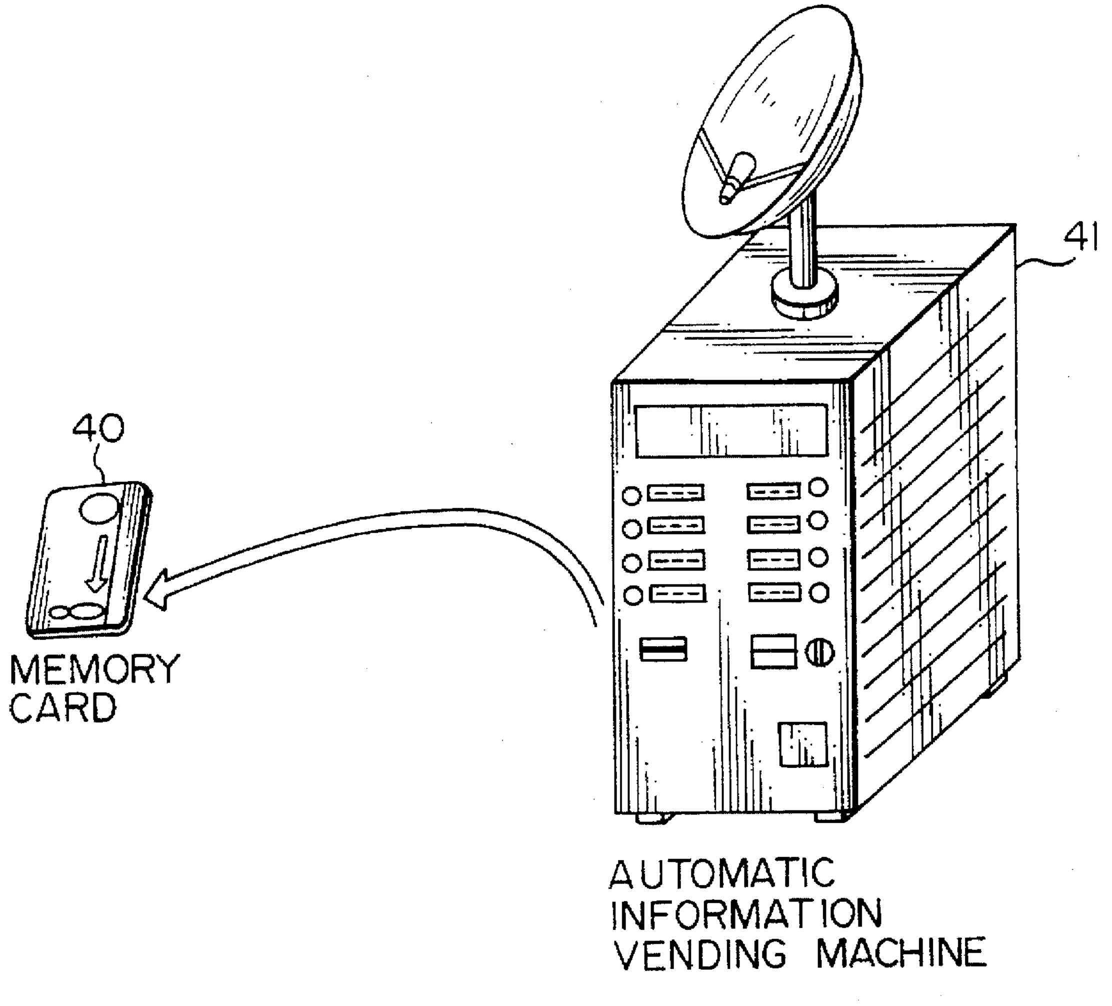
FIG. 2 illustrates an external appearance of the automatic information vending machine according to the present invention.

FIG. 2 illustrates an external appearance of the automatic information vending machine according to the present invention. As indicated in FIG. 2, the automatic information vending machine has a receiver antenna for receiving signals carrying information transmitted from the communications satellite. The information transmitted from the integrated circuit through the communications satellite, is stored in the automatic information vending machine. Customers who wish to buy (information in) a magazine or newspaper can receive the information in the magazine or newspaper by operating the automatic information vending machine and paying a necessary charge for the information, as explained later. The information is output from the automatic information vending machine to the customer by writing the information in a portable piece of storage medium, such as a memory card or a floppy disk. As explained later, the piece of storage medium may be brought to the automatic information vending machine by the customer, and be inserted into an inlet for the piece of storage medium, provided on the automatic information vending machine, to have the information written in the piece of storage medium. Alternatively, the automatic information vending machine may stock a number of pieces of storage medium therein so that the automatic information vending machine can write the information in one of the stocked pieces of storage medium and then output the piece of storage medium to the customer who requests the information. After receiving the piece of storage medium in which the information has been written, the customer can read the information by inserting the piece of storage medium into a terminal apparatus by which the content of the piece of storage medium can be read. The terminal apparatus is, for example, a personal computer with a floppy disk drive, or a memory card reader.

OUTLINE OF CONSTRUCTION OF AUTOMATIC VENDING MACHINE (FIG. 3)

Figure 3:
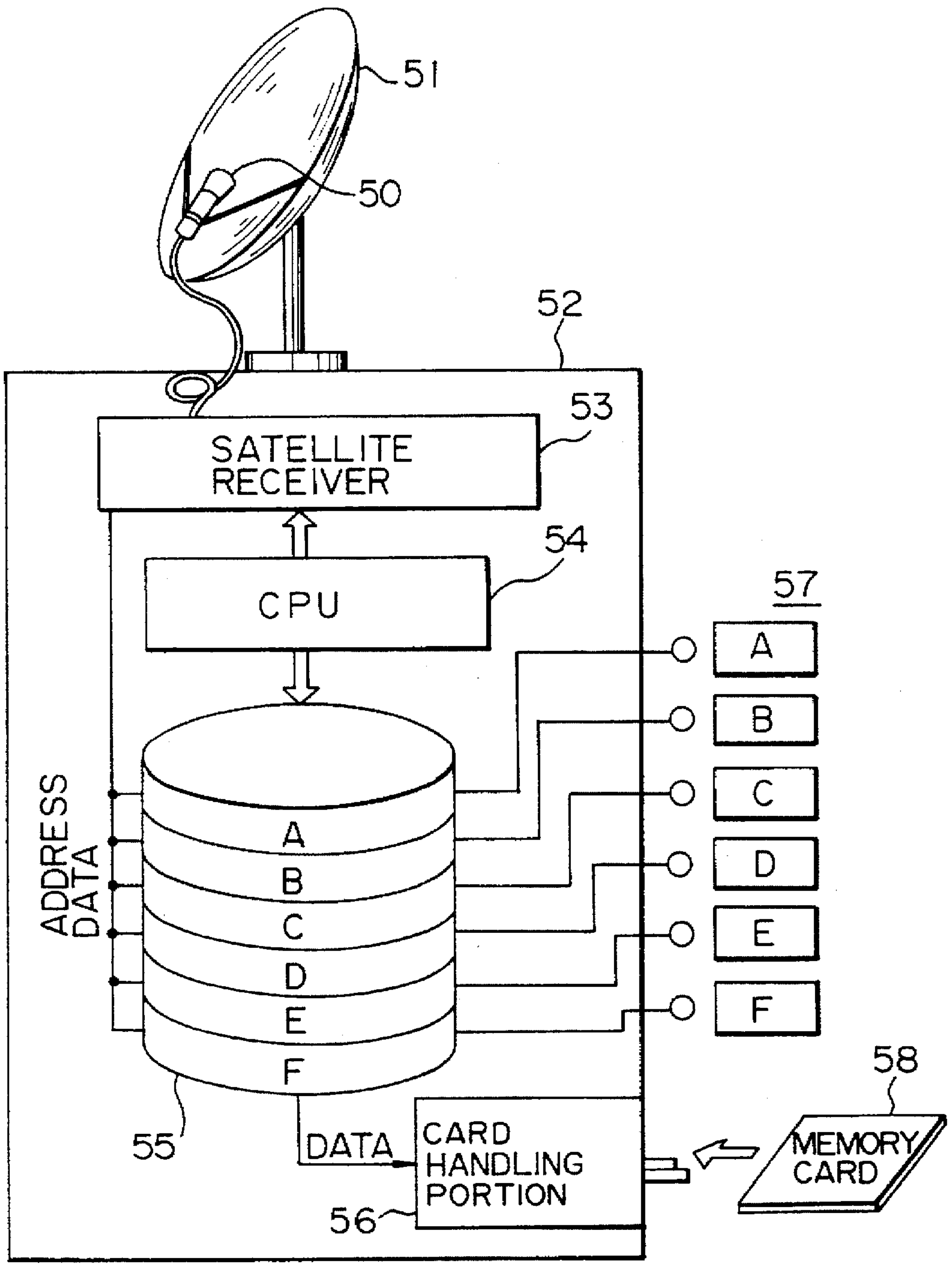
FIG. 3 illustrates an outline of the automatic information vending machine as an embodiment of the present invention.

FIG. 3 illustrates an outline of the construction of the automatic information vending machine as an embodiment of the present invention. In FIG. 3, reference numeral 50 denotes a low-noise block converter (LNB), 51 denotes a receiver antenna, 52 denotes a box containing the main frame of the automatic information vending machine, 53 denotes a satellite receiver for receiving a signal transmitted from a communications satellite, 54 denotes a central processing unit (CPU), 55 denotes a storage, 56 denotes a card handling unit, and 57 denotes front panel switches.

The receiver antenna 51 is directly mounted on the box of the automatic information vending machine in FIG. 3. The receiver antenna 51 may be placed at another place remote from the place of the main frame of the automatic information vending machine, and the receiver antenna 51 and the main frame of the automatic information vending machine may be connected with a cable. For example, the main frame of the automatic information vending machine may be placed in front of a book shop facing a street, and the receiver antenna may be placed on the roof of the book shop.

As indicated in FIG. 3, the receiver antenna 51 is accompanied with the low-noise block converter (LNB) 50. The signal transmitted from the communications satellite is scrambled and modulated. The frequency of the signal transmitted from the communications satellite is converted from the Ku band to the L band in the low-noise block converter (LNB) 50, and the frequency-converted signal is then demodulated and descrambled in the satellite receiver 53. The signal carries information (to be delivered to customers) in blocks, and also carries information on a kind or an attribute of the information. The information in each block is stored in an area corresponding to its kind (or attribute) in a storage 55, based on the information on the kind or attribute, under control of the CPU 54. The storage 54 can be a RAM (random access memory), an EEPROM (electrically erasable programmable read only memory), or a magnetic disk unit, and the like. An area is allocated in advance, for each kind or attribute of the information which is expected to be transmitted from the communications satellite. Each automatic information vending machine can be preset by transmitting a command thereto, by manually setting a manual switch, or by inputting a command through a keyboard provided on the automatic information vending machine, so that the automatic information vending machine can receive one or more specific kinds or attributes of information transmitted from the communications satellite in accordance with the command or the manual setting.

The front panel switches 57 are provided corresponding to a plurality of items of information stored in the storage 55 in the automatic information vending machine, and the contents (for example, abstracts, headlines, names of magazines, names of newspapers, dates of issues, versions, and the like) of the respective items are respectively indicated with their charges as a menu. Therefore, each customer can select one of the items and operate one of the switches corresponding to the selected item to input his request into the automatic information vending machine.

The card handling unit 56 writes information requested by the customer (by inputting his request through the front panel switches 57 as above) in a memory card, and then outputs the memory card outward to the customer, under control of the CPU 54. In addition, the card handling unit 56 also receives the customer's memory card when the customer inserts his memory card into the card handling unit 56. In this case, the card handling unit 56 writes the information in the customer's memory card, and then outputs the memory card outward to the customer.

DATA FORMAT OF SIGNAL TRANSMITTED FROM SATELLITE (FIG. 4)

Figure 4:
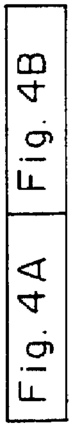
FIG. 4 (a composite of FIGS. 4*a* and 4*b*) indicates an example format of data received from a communications satellite in the embodiment of the present invention.
Figure 4A:
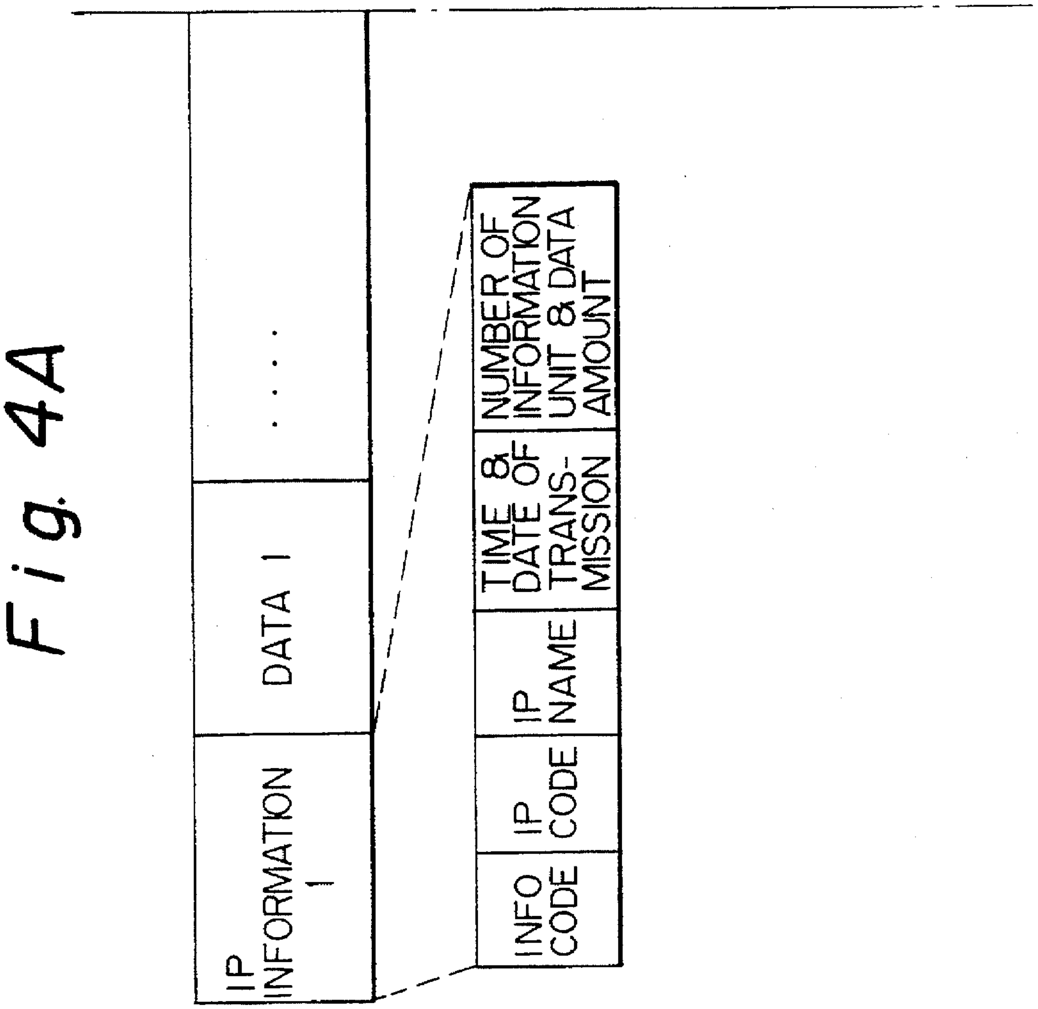
Figure 4B:
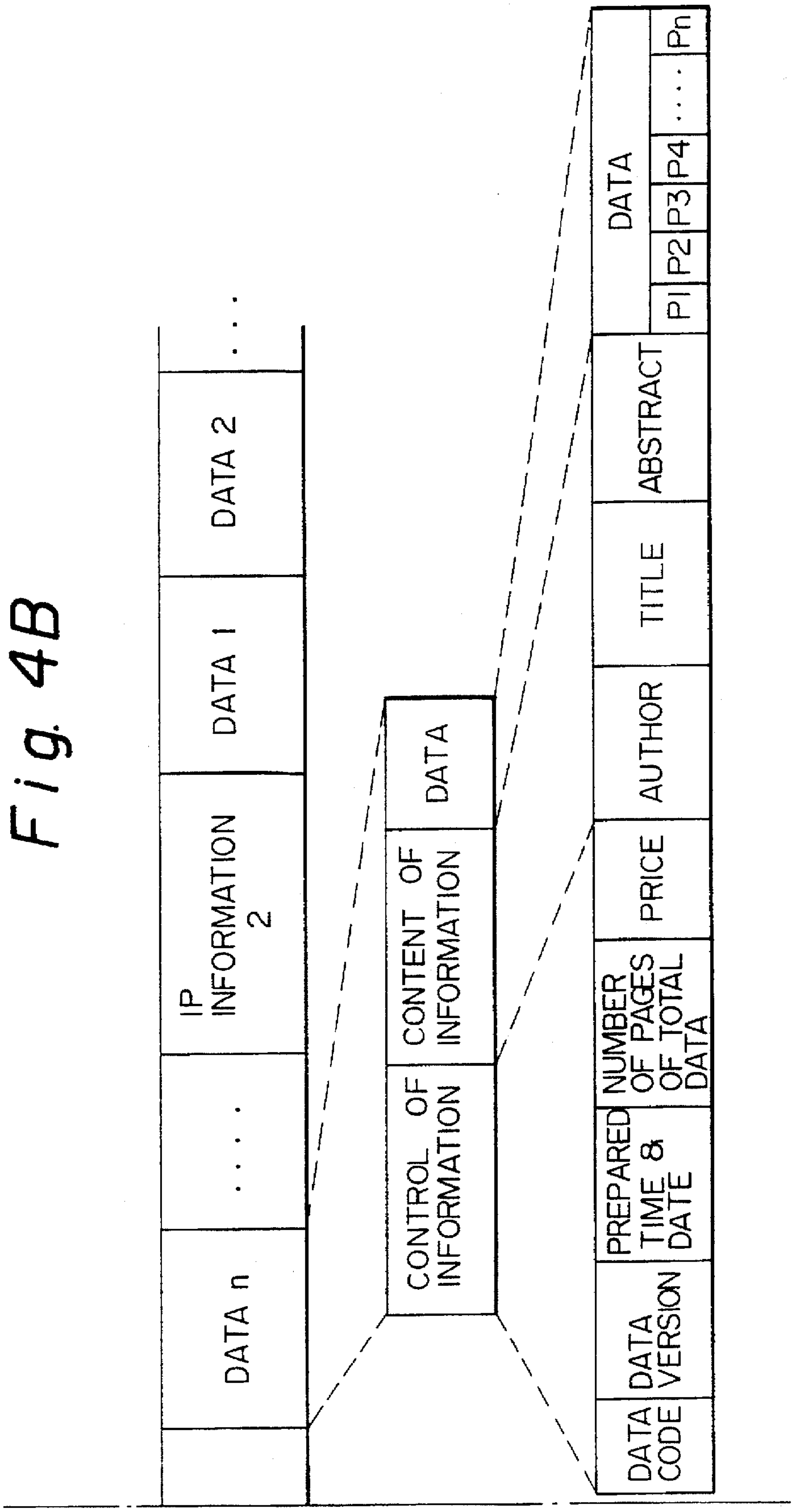

FIG. 4 indicates an example format of data received from a communications satellite in the embodiment of the present invention. As indicated in the top row of FIG. 4, the data format contains an IP information block, and a plurality of data blocks following the IP information block. As indicated in the middle row of FIG. 4, the IP information block contains a plurality of areas respectively for "INFORMATION CODE", "IP CODE", "IP NAME", "TIME AND DATE OF TRANSMISSION", and "NUMBER (n) OF DATA BLOCKS AND DATA AMOUNT (Kilobytes)". The area "INFORMATION CODE" contains information indicating what kind of information is contained in the following data blocks, for example, general newspaper, sports newspaper, a weekly magazine, or maintenance information for the automatic information vending machine. The area "IP CODE" contains the name of the information, for example, the name of newspaper, the name of a magazine, or the like. The area "IP CODE" contains a code indicating the above name. The area "TIME AND DATE OF TRANSMISSION" contains information on the time and date on which the information has been transmitted from the information transmission center, and the area "NUMBER (n) OF DATA BLOCKS AND DATA AMOUNT (Kilobytes)" contains information indicating the number of the data blocks following the IP block, and the data amount of the data blocks following the IP block. As indicated in the middle row of FIG. 4, each data block contains areas "CONTROL DATA OF INFORMATION", "CONTENT OF INFORMATION", and "DATA". The details of these areas are indicated in the bottom row of FIG. 4. The area "CONTROL DATA OF INFORMATION" contains areas "DATA CODE", "DATA VERSION", "PREPARED TIME AND DATE", "NUMBER OF PAGES OF TOTAL DATA", and "PRICE". The area "CONTENT OF INFORMATION" contains areas "AUTHOR", "TITLE", and "ABSTRACT". The area "DATA" contains a plurality of sections "P1", "P2", . . . "Pn", each corresponding to a page. The above area "DATA CODE" contains information comprised of a genre identification code and an article identification code. The genre identification code is predetermined for each genre of article, and the article identification code is provided for identifying each article. The contents of the other of the above areas will be self-explanatory from their names.

INFORMATION MANAGEMENT TABLE (FIG. 5)

FIG. 5 indicates an example content of an information management table in the embodiment of the present invention. The automatic information vending machine as an embodiment of the present invention generates an information management table as indicated in FIG. 5, in an area of a RAM provided in the central processing unit 54. Using the information management table, a menu search service can be provided for customers. That is, using the information management table, a menu search for a specific IP code (by displaying all items of the specific IP code), a menu search for a specific genre (by displaying all items of the specific genre), a menu search for a specific time and date (by displaying all items of the specific time and date), a menu search for a specific author (by displaying all items of the specific author), and a menu search for a specific combination of any of the above conditions, can be performed. For the above menu search service, it is preferable for the automatic information vending machine to have a display unit, such as a liquid-crystal display device.

Figure 6:
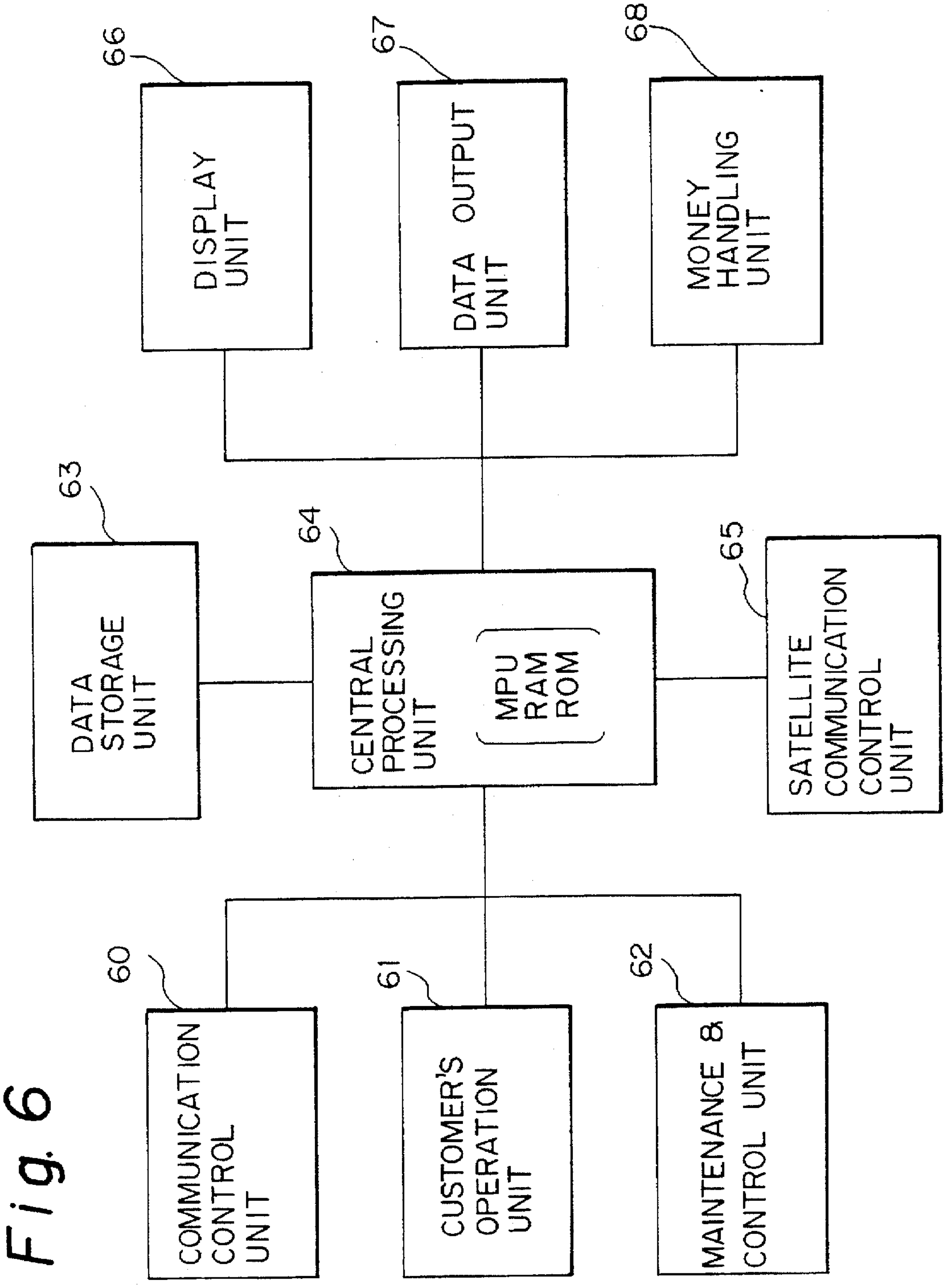
FIG. 6 is a block diagram indicating an outline of an internal construction in the embodiment of the present invention.
Figure 7A:
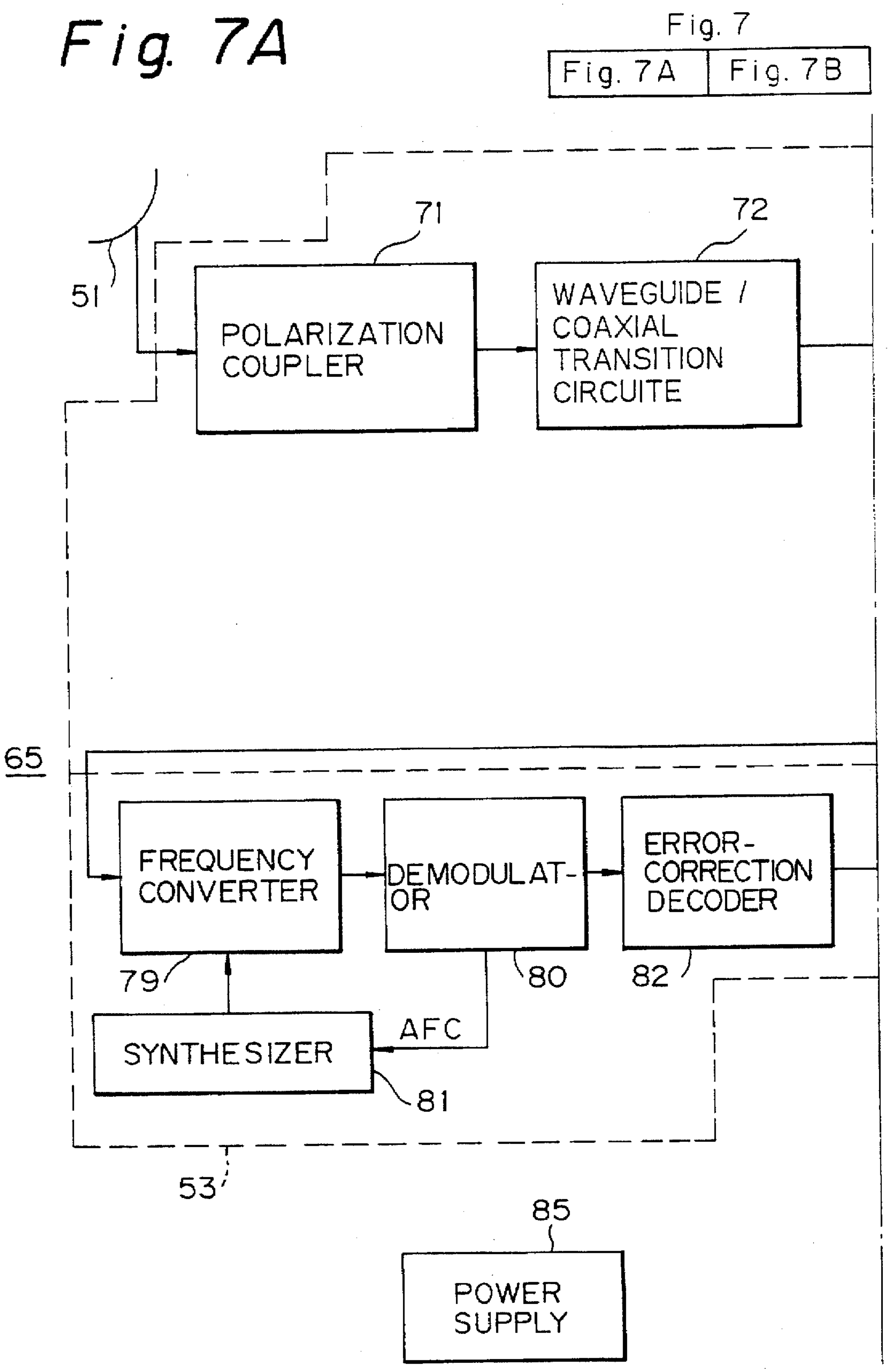
FIGS. 7A and 7B are a block diagram indicating details of an internal construction for receiving a signal transmitted from a satellite in the embodiment of the present invention.
Figure 7B:
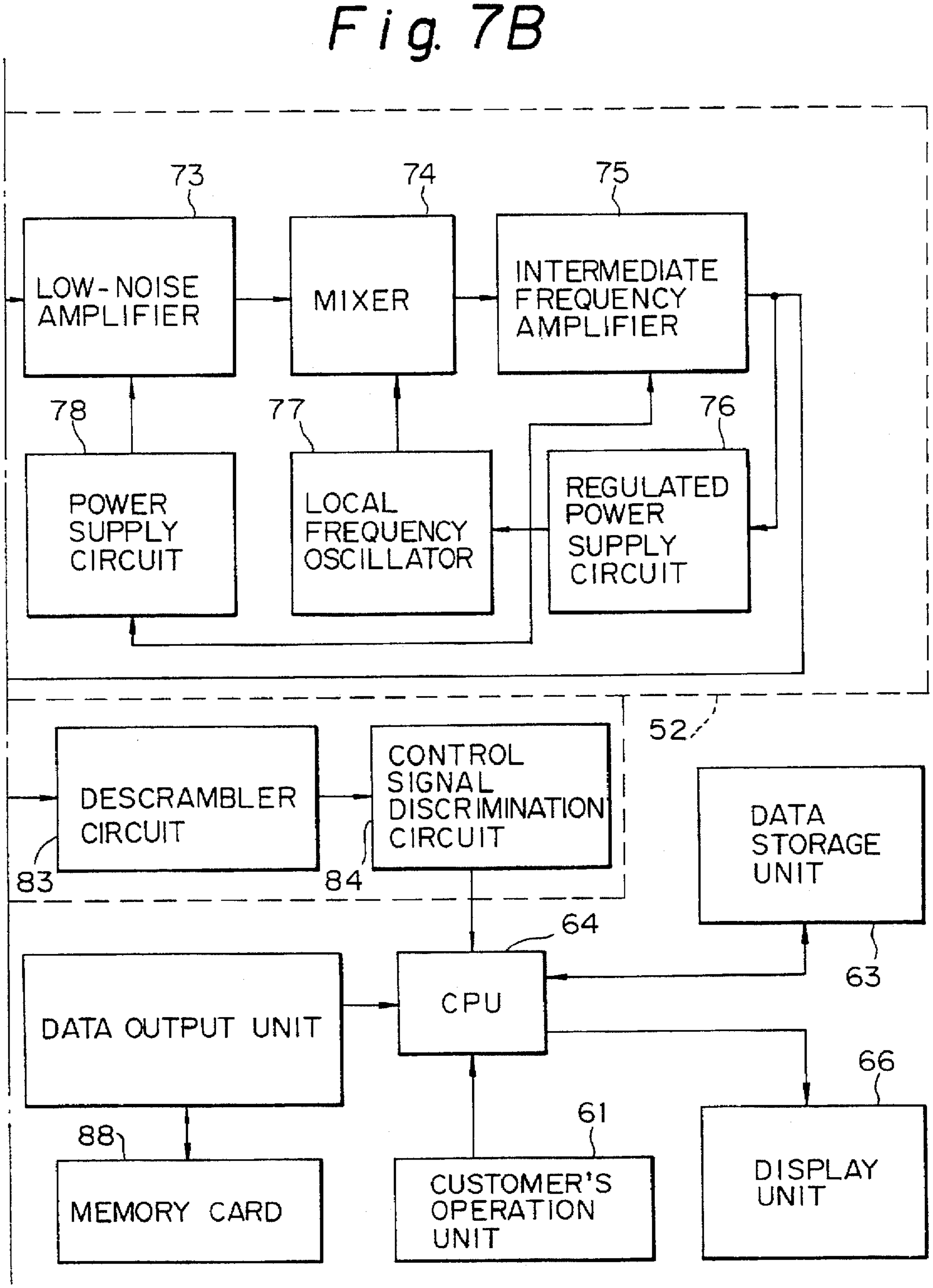

INTERNAL CONSTRUCTION (FIGS. 6, 7A, and 7B)

FIG. 6 is a block diagram indicating an outline of an internal construction in the embodiment of the present invention. In FIG. 6: reference numeral 60 denotes a communication control unit for controlling communication through a transmission line (or network) on the ground; 61 denotes a customer's operation unit for customers to operate the unit for inputting a request for buying information; 62 denotes a maintenance control unit for monitoring and controlling all portions and operations of the automatic information vending machine; 63 denotes a data storage for storing information to be sold, 4 denotes the central processing unit, containing a microprocessor unit (MPU), a RAM, and a ROM, to constitute a microcomputer which controls the overall operations of the automatic information vending machine, 65 denotes a satellite communication control unit for controlling communications through the communications satellite; 66 denotes a display unit for displaying the contents of information to be sold, and a message to a customer who is operating the automatic information vending machine; 67 denotes a write processing unit for writing information requested by the customer in a piece of storage medium, based on the above request for buying information; and 68 denotes a money handling unit for handling money to receive a charge of the information requested by the customer.

FIGS. 7A and 7B are a block diagram indicating details of an internal construction for receiving a signal transmitted from a satellite in the embodiment of the present invention. In FIGS. 7A and 7B, reference numeral 51 denotes a receiver antenna, 50 denotes a low-noise block converter (LNB), and 53 denotes a satellite receiver. In the low-noise block converter (LNB) 50, reference numeral 71 denotes a polarization coupler, 72 denotes a waveguide/coaxial transition circuit, 73 denotes a low-noise amplifier, 74 denotes a mixer, 75 denotes an intermediate frequency amplifier, 76 denotes a regulated power supply circuit, 77 denotes a local frequency oscillator, and 78 denotes a power supply circuit. In the satellite receiver 53, reference numeral 79 denotes a frequency converter, 80 denotes a demodulator, 81 denotes a synthesizer, 82 denotes an error correction circuit, 83 denotes a descrambler for descrambling a scrambled (scrambled) signal, and 84 denotes a control signal discrimination circuit. The other elements with reference numerals 61, 63, 64, 66, and 67 are the same as the elements having the same reference numerals in FIG. 6. Since the above constructions and their operations of the low-noise block converter (LNB) 50 and the satellite receiver 53 are well known, the explanations of the low-noise block converter (LNB) 50 and the satellite receiver 53 are omitted in this specification.

PLANAR ANTENNA (FIGS. 8, 9, 10, and 11)

Figure 8:
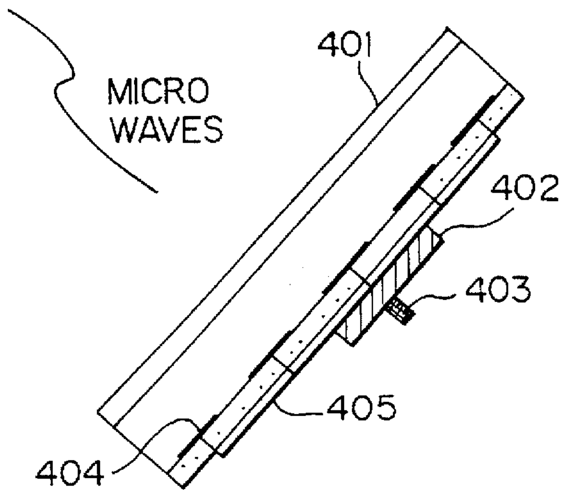
FIG. 8 is a cross-sectional view of a planar antenna.

FIG. 8 is a cross-sectional view of a planar antenna. In FIG. 8, reference numeral 401 denotes a redome, 402 denotes a low-noise block converter (LNB), 403 denotes an output terminal of the low-noise block converter (LNB) from which a signal in the 1 GHz-band waves is output, 404 denotes a planar antenna array constituted by micro strip circuits, and 405 denotes a power supply circuit.

Figure 9:
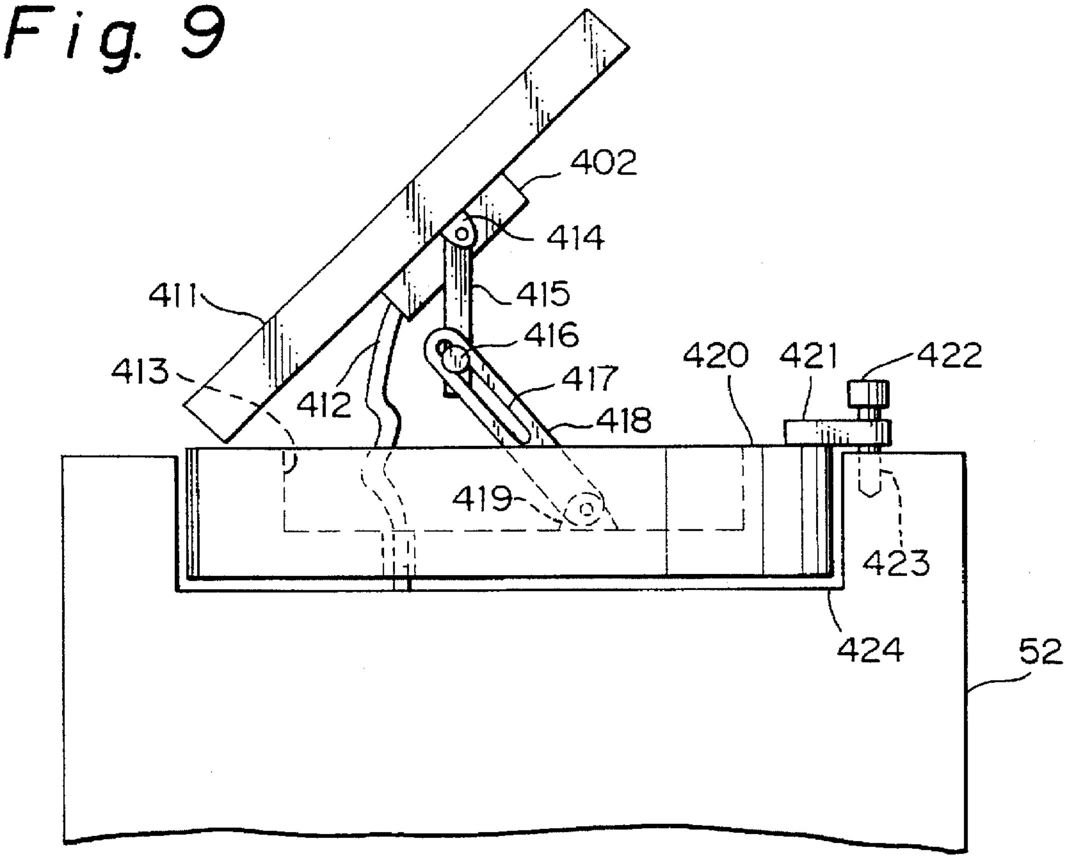
FIG. 9 illustrates a structure for mounting a planar antenna on a box of the automatic information vending machine.
Figure 10:
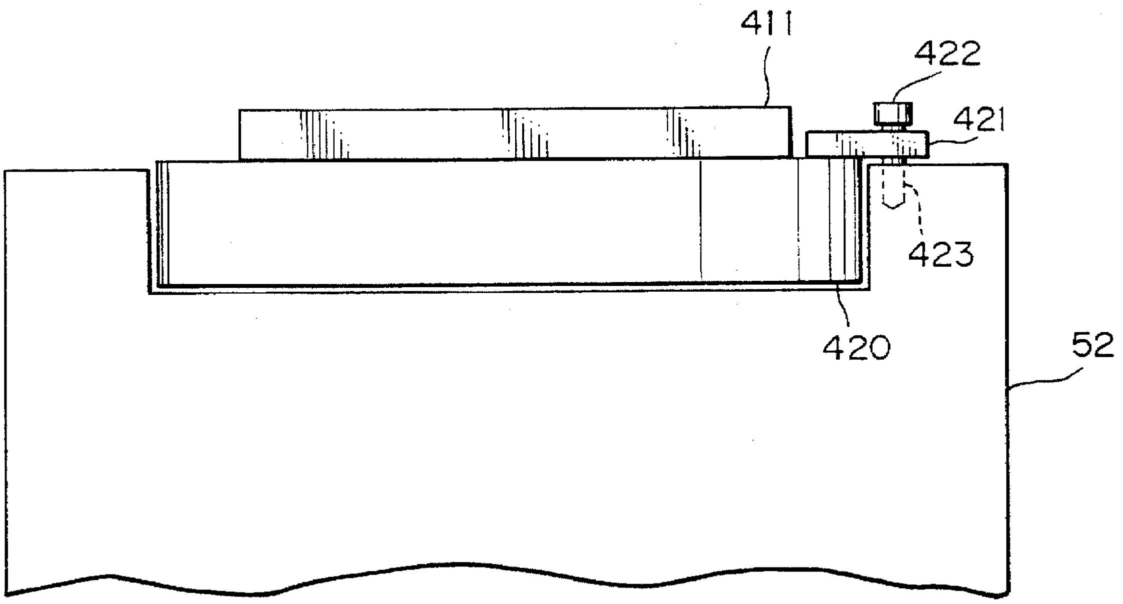
FIG. 10 illustrates an external appearance of an upper portion of the automatic information vending machine when the planar antenna is laid down.
Figure 11:
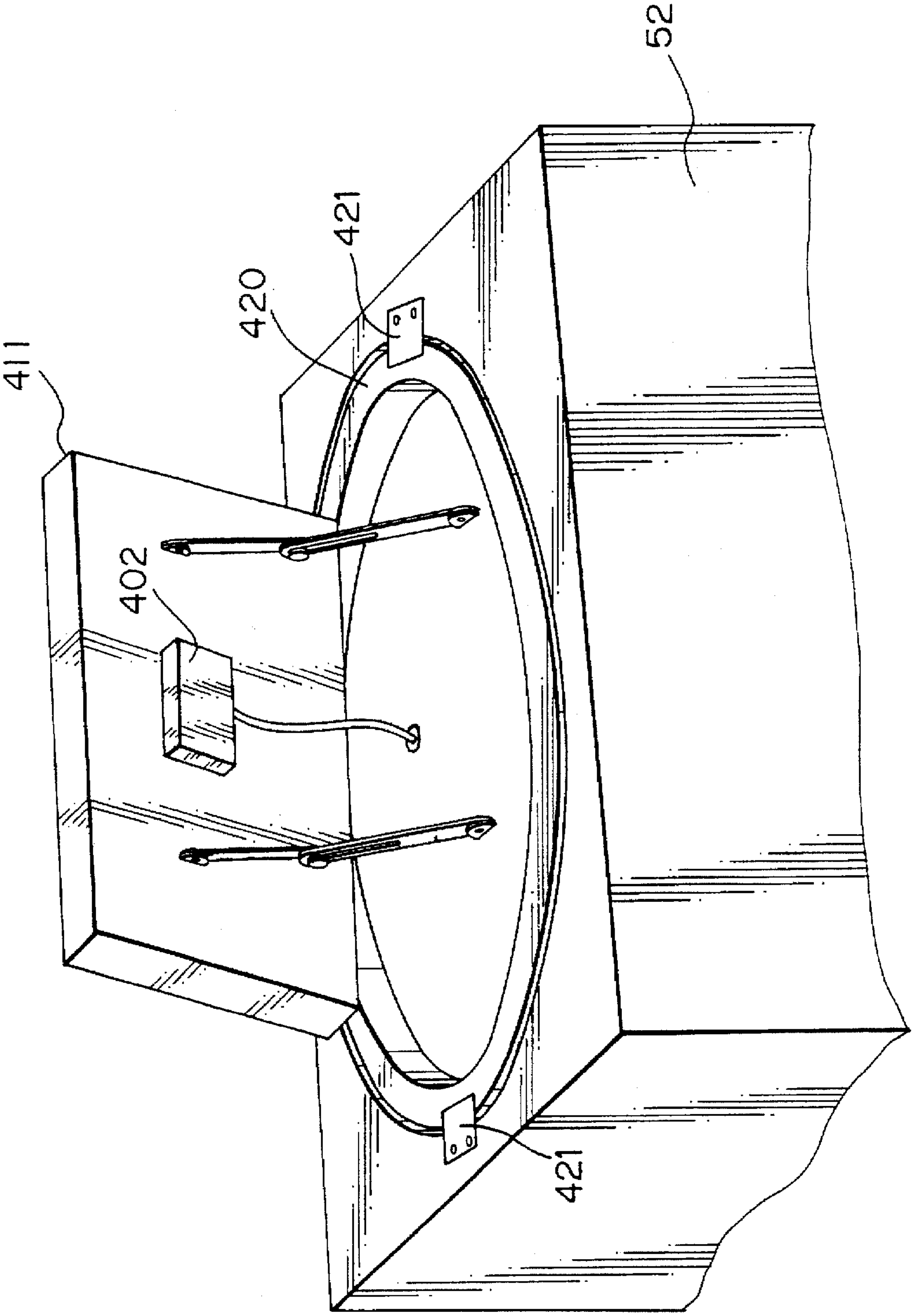
FIG. 11 illustrates an external appearance of the automatic information vending machine according to the present invention.

FIG. 9 illustrates a structure for mounting the planar antenna on the box 52 of the automatic information vending machine. In FIG. 9, reference numeral 52 denotes the box containing the main frame of the automatic information vending machine, 402 denotes the low-noise block converter (LNB), 411 denotes a planar antenna, 412 denotes a cable connecting the low-noise block converter (LNB) 402 and the satellite receiver 53 in the box 52, 413 denotes a concave portion provided in a rotatable table 420, 414 and 419 each denote a pivot, 415 and 418 denote bars linked with each other at a bolt 416, 416 denotes the bolt, 417 denotes a slit provided in the bar 418, 420 denotes a rotatable table, 421 denotes a table stopper plate, 422 denotes a bolt, 423 denotes a threaded hole provided on the top surface of the box 52 around the rotatable table 420, and 424 denotes a concave portion provided in the top portion of the box 52 for containing a rotatable table 420. As illustrated in FIG. 9, one end of the bar 415 is pivoted at a point on the rear surface of the planar antenna 411, and one end of the bar 418 is pivoted at a point on a bottom plane of the concave portion 413. The slit 417 is provided from the other end to the middle portion of the bar 418 as indicated in FIG. 9. The bolt 416 has a head, and the diameter of the head is larger than the width of the slit 417. The bolt 416 passes through the slit 417, and is threaded at the other end of the bar 415 so that the bars 415 and 418 are linked with each other at the bolt 416, and the bars 415 and 418 are fixed to each other when the bolt is fastened to make the head of the belt press the bar 418 onto the bar 415. When the belt 416 is unfastened, the position of the bolt 416 can move freely within the slit 417 so that bars 415 and 418 can be folded to allow the planar antenna 411 lay down on the rotatable table 420. FIG. 10 illustrates an external appearance of an upper portion of the automatic information vending machine when the planar antenna is laid down. When the planar antenna is laid down, the folded bars 415 and 418 and the low-noise block converter (LNB) 414 which protrude from the rear surface of the planar antenna 411, can be contained in the concave portion 413 provided in the rotatable table 420. One end of the stopper plate 421 is fixed to the outer end of the rotatable table 420, and the other end of the stopper plate 421 extends over a portion, around the rotatable table 420, of the top surface of the box 52, and at least one penetrating hole is provided at the other end of the stopper plate 421. Threaded holes are provided on the top surface of the box 52 around the rotatable table 420 so that the stopper plate 42 can be fixed to the top surface of the box 52 at any of the threaded holes when letting the threaded bolt 422 pass through the hole in the stopper plate 421 and be threaded to the threaded hole on the top surface of the box 52. FIG. 11 illustrates an external appearance of the automatic information vending machine according to the present invention. According to the above construction, the angle between the top surface of the box 52 and the planar antenna 411 can be arbitrarily adjusted by fixing the bolt 416 at an appropriate position in the slit 417, and the azimuth of the planar antenna 411 can also be adjusted arbitrarily by fixing the rotatable table 420 with the stopper plate 421 at an appropriate position.

Figure 12:
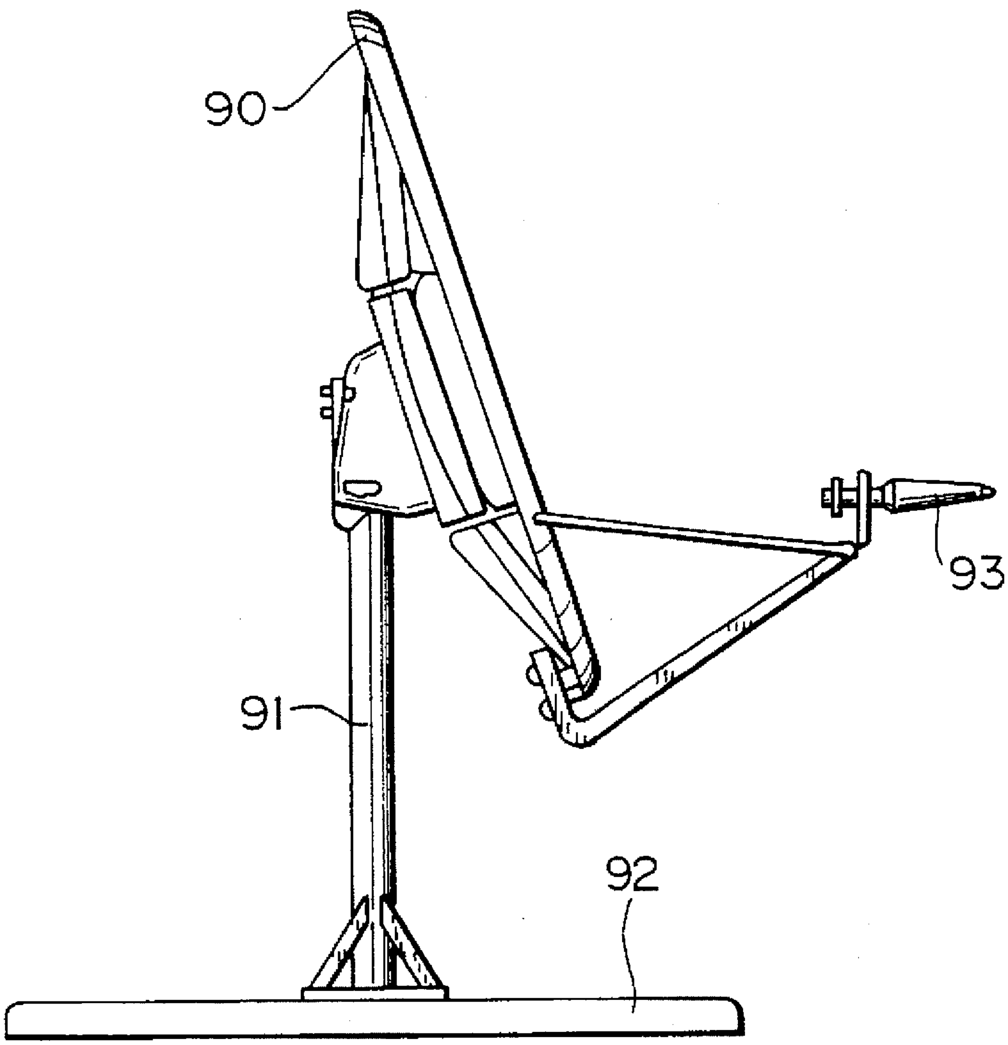
FIGS. 12 and 13 illustrate an external appearance of a parabolic antenna which can be mounted on the box of the automatic information vending machine according to the present invention.
Figure 13:
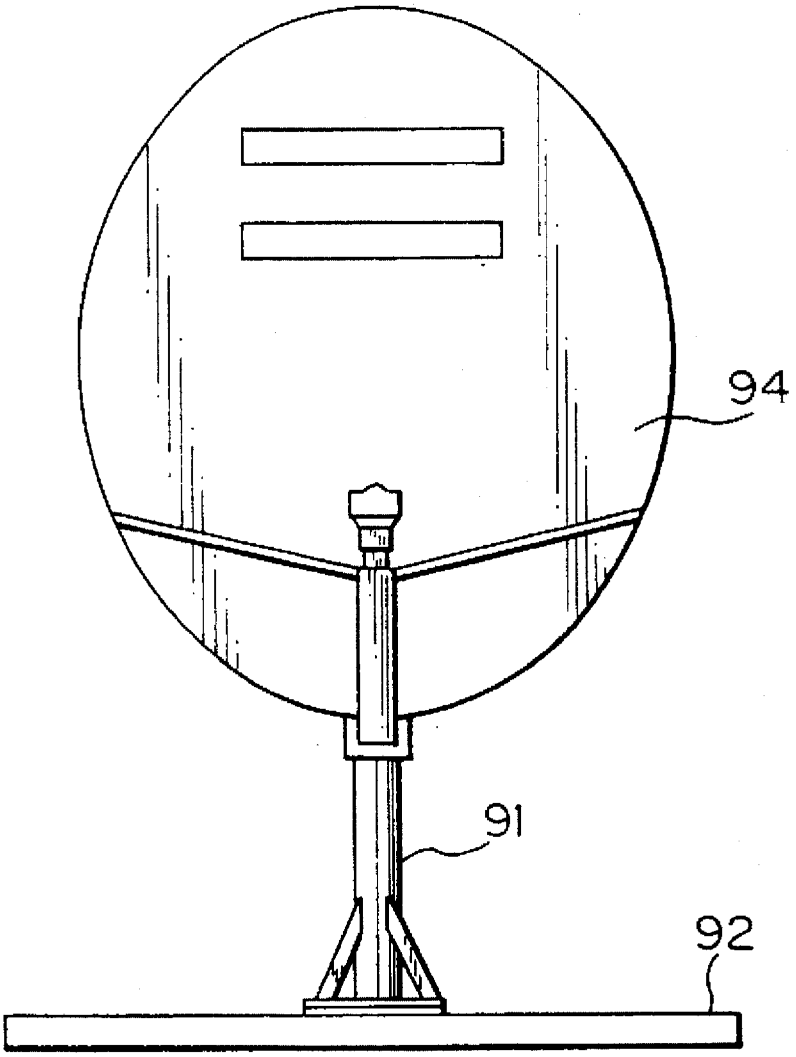

PARABOLIC ANTENNA (FIGS. 12 and 13)

FIGS. 12 and 13 illustrate an external appearance of a parabolic antenna which can be mounted on the box of the automatic information vending machine according to the present invention. As illustrated in FIGS. 12 and 13, the parabolic antenna comprises an antenna portion 90, a mast portion 91, a base portion 92 for supporting the mast portion 91, and a low-noise block converter (LNB) 93. Each portion of the parabolic antenna illustrated in FIGS. 12 and 13 can be separated from the other portions, and is portable. Therefore, the parabolic antenna can be mounted on a roof separated from the box 52 containing the main frame of the automatic information vending machine, and the parabolic antenna and the main frame can be connected with a cable.

Figure 14:
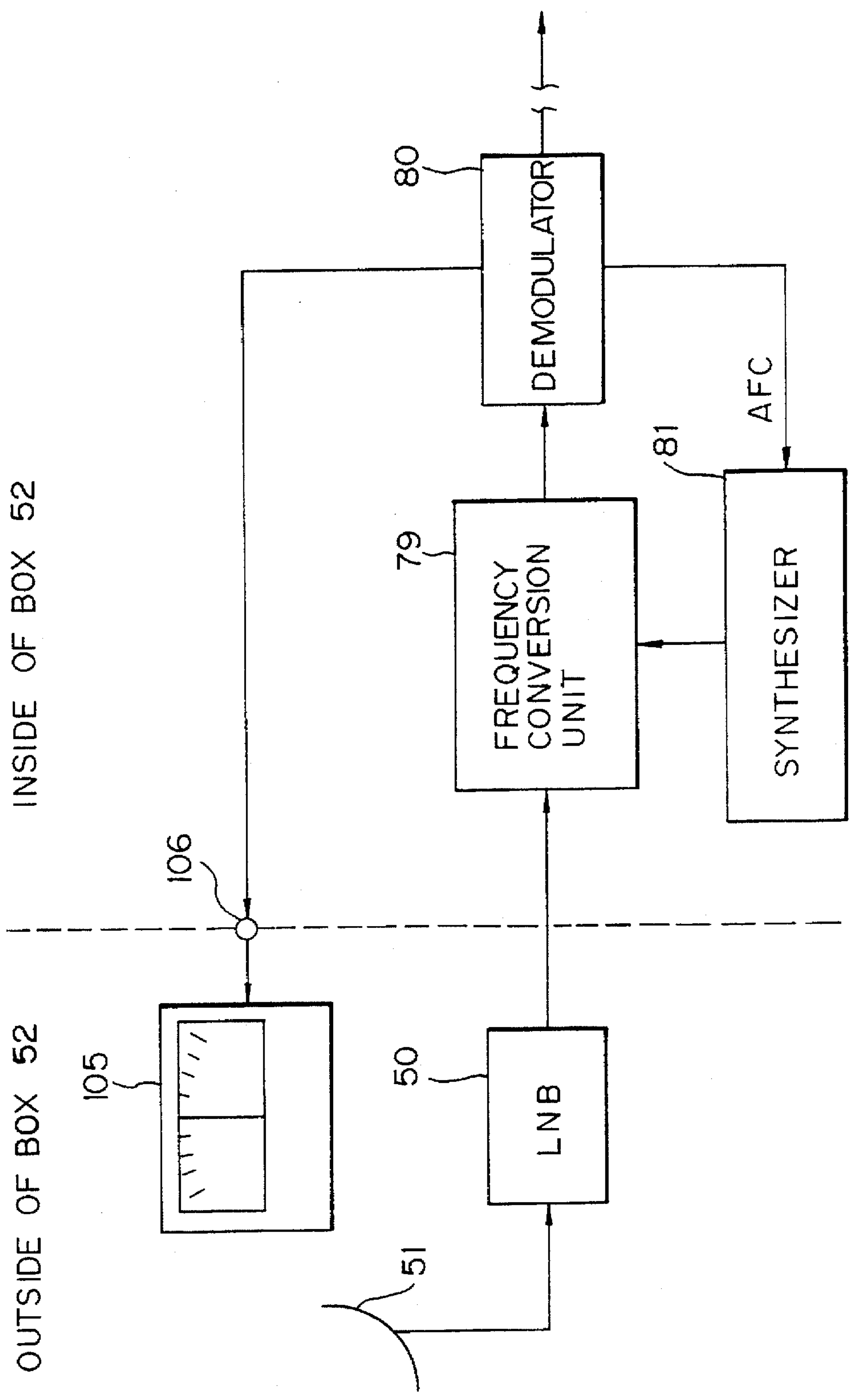
FIG. 14 illustrates an example construction for measuring a level of a received signal at the automatic information vending machine as the embodiment of the present invention.
Figure 15:
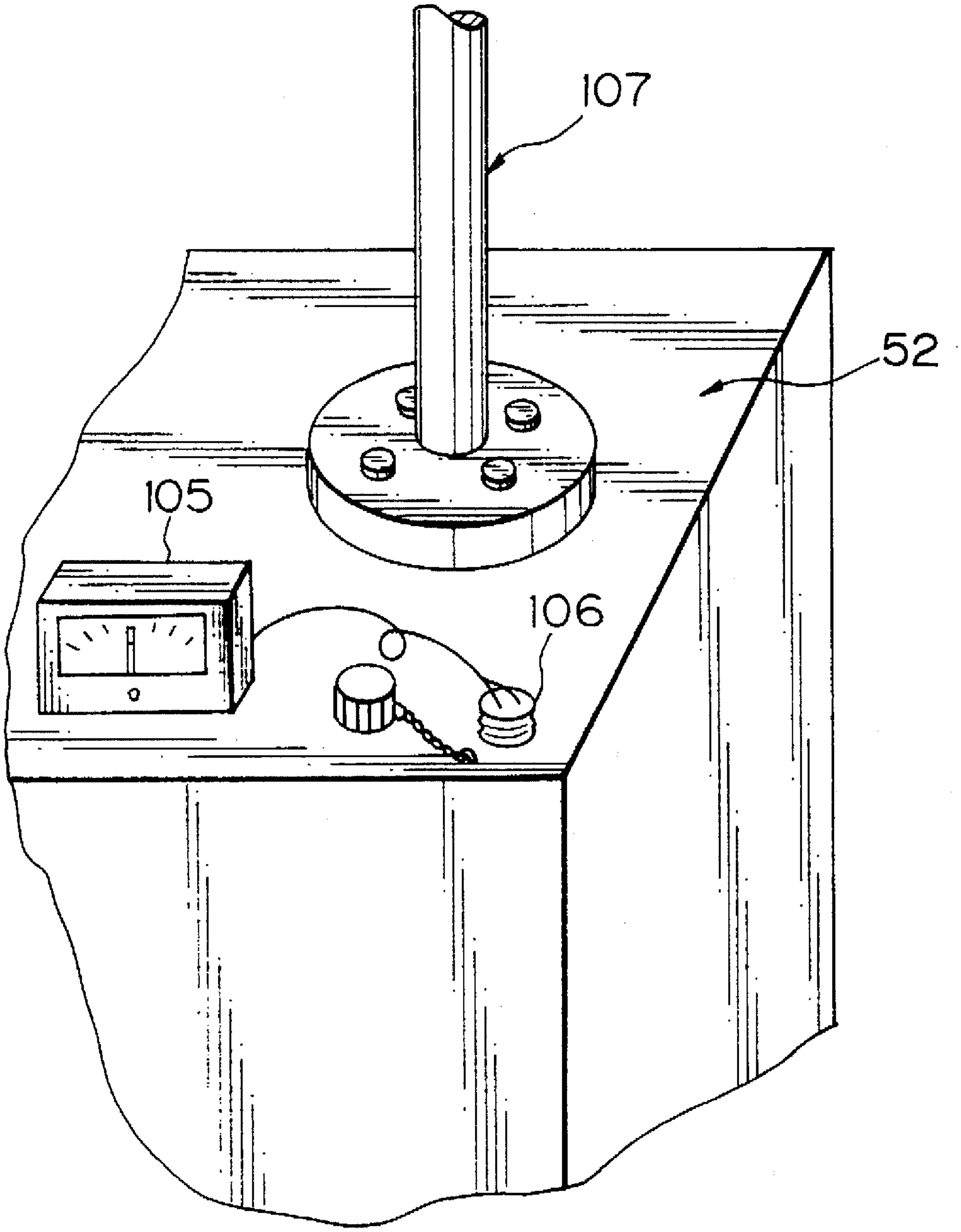
FIG. 15 illustrates an external appearance of the construction for measuring a level of a received signal at the automatic information vending machine as the embodiment of the present invention.

MEASUREMENT OF RECEIVING LEVEL (FIGS. 14 and 15)

FIG. 14 illustrates an example construction for measuring a level of a received signal at the automatic information vending machine as the embodiment of the present invention. In FIG. 14, reference numeral 51 denotes a receiver antenna, 50 denotes a low-noise block converter (LNB), 79 denotes a frequency converter, 80 denotes a demodulator, 81 denotes a synthesizer, 105 denotes a CS level checker, and 106 denotes an output terminal for monitoring the level of the receiving signal. The construction of FIG. 14, other than the CS level checker 105 and the output terminal 106, is the same as indicated in FIGS. 7A and 7B. In FIG. 14, the output of the demodulator 80 is branched to the output terminal 106 so that the level of the received signal can be monitored from outside of the box 52 through the output terminal 106. Thus, the CS level checker 105 can be connected to the output terminal 106 to monitor the level. The CS level checker 105 may be permanently connected to the terminal 106, or may be temporarily connected to the terminal 106 when adjusting the orientation of the receiver antenna 51. The operator can adjust the orientation of the receiver antenna 51 referring to the CS level checker 105. FIG. 15 illustrates an external appearance of the construction for measuring the level of the received signal by the above arrangement.

Figure 16:
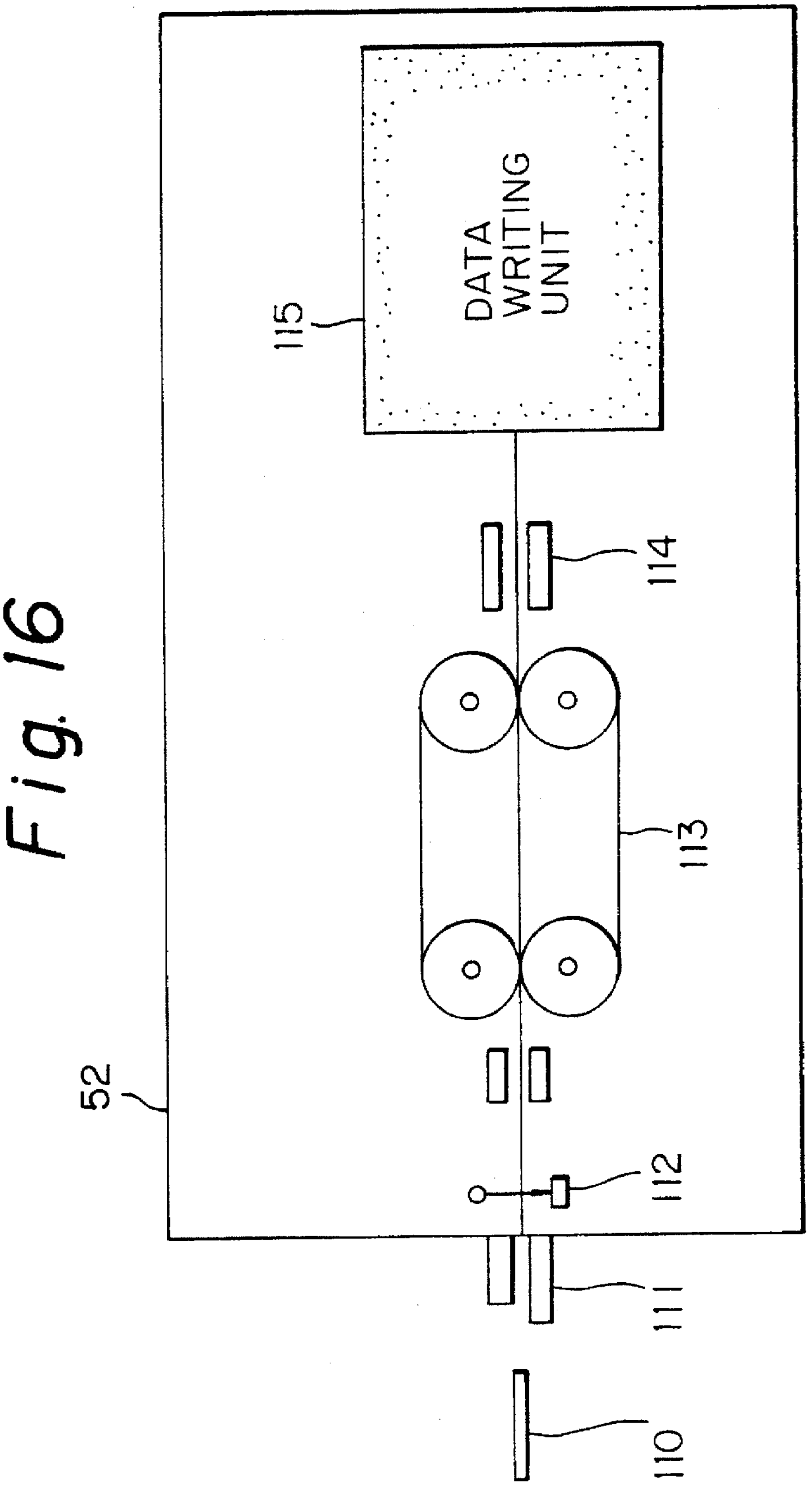
FIG. 16 illustrates an outline of a memory card handling mechanism in the embodiment of the present invention.
Figure 17:
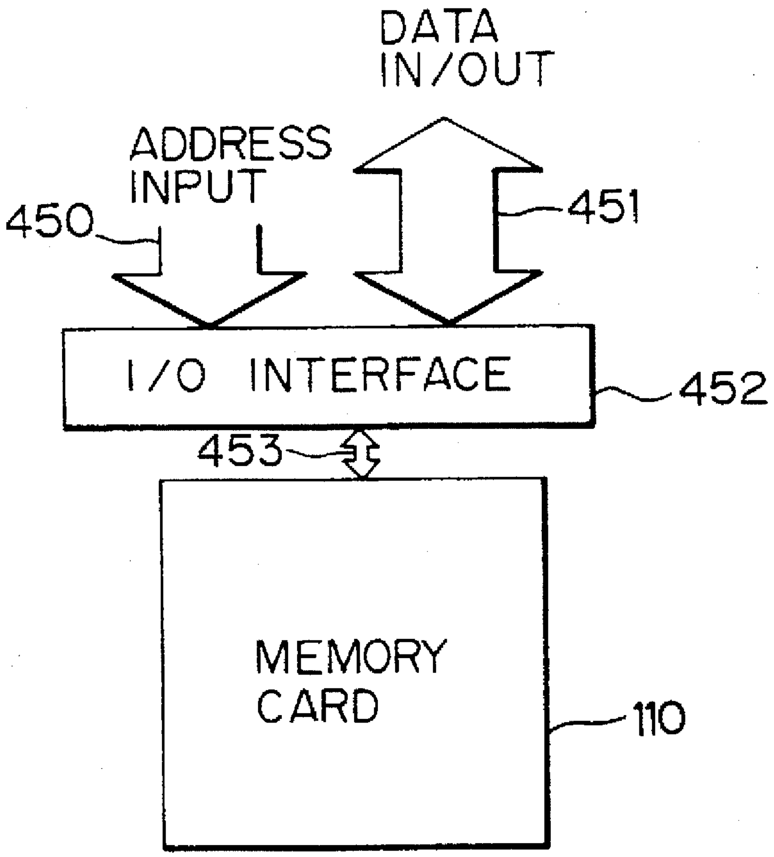
FIGS. 17 illustrates the construction of the data writing unit 115 in FIG. 16.

CARD HANDLING MECHANISM (FIGS. 16 and 17)

FIG. 16 illustrates an outline of a memory card handling mechanism in the embodiment of the present invention. In FIG. 16, reference numeral 110 denotes a memory card, 111 denotes a card inlet (and outlet), 112 denotes a sensor unit, 113 denotes a motor driving unit, 114 denotes a discriminating unit, 115 denotes a data writing unit as a part of the data output unit 67 as indicated in FIG. 6.

When a customer inserts a memory card into the memory card handling mechanism of FIG. 16 through the card inlet 111, the sensor unit 12 detects the insertion of the memory card to drive the motor driving unit 113 so that the inserted memory card is pulled inward to the discriminating unit 114. The discriminating unit 114 examines the memory card to determine whether or not the memory card is a kind of memory card which is allowed to be used in the automatic information vending machine. When no is determined, the memory card 110 is moved outward to the card inlet/outlet 111 so that the memory card 110 is output through the card inlet/outlet 111. When yes is determined, the memory card is moved to the data writing unit 115.

FIGS. 17 illustrates the construction of the data writing unit 115 in FIG. 16. In FIG. 17, reference numeral 450 denotes an address bus, 451 denotes a data bus, 452 denotes an I/O interface, and 453 denotes a connector for connecting address input terminals (not shown) and data input/output terminals (not shown) with the I/O interface 451. The address bus 450 and the data bus 451 are respectively connected to the CPU 64 (FIG. 6). In the construction of FIG. 17, Address signals are applied from the CPU 64 to the address input terminals of the memory card 110 through the address bus 450 and the I/O interface 452, and the data to be written in the memory card 110 can be applied to the data input/output terminals of the memory card 110 through the data bus 451 and the I/O interface 452 when writing data in the memory card 110. When reading data stored in the memory card 110 by the CPU 64, the data is output from the data input/output terminals of the memory card 110 through the I/O interface 452 and the data bus 451 to the CPU 64.

Going back to FIG. 16, when the operation of writing data in the memory card 110 in the data writing unit 115 is completed, the memory card 110 is moved outward to the card inlet/outlet 111 so that the memory card 110 is output through the card inlet/outlet 111.

Figure 18:
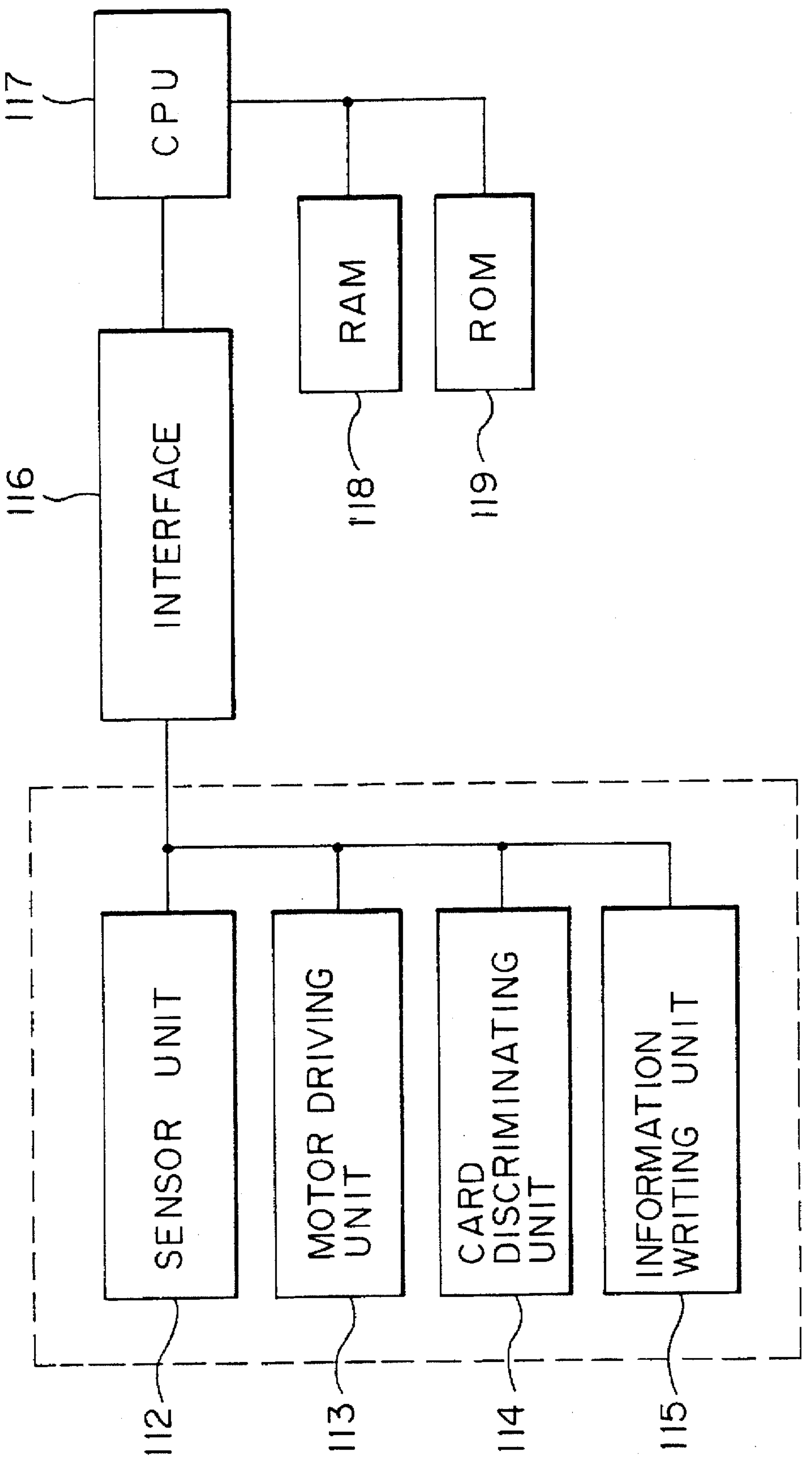
FIG. 18 illustrates a construction for controlling the memory card handling mechanism in the embodiment of the present invention.

FIG. 18 illustrates a construction for controlling the memory card handling mechanism in the embodiment of the present invention. In FIG. 18, reference numerals 112 to 115 are respectively the same units as indicated in FIG. 16. Further, reference numeral 116 denotes an interface, 117 denotes the CPU, 118 denotes a RAM, and 119 denotes a ROM. The CPU 117, the RAM 118, and the ROM 119 constitute a microcomputer for controlling the above operations of the memory card handling mechanism in FIG. 16. The CPU 117, the RAM 118, and the ROM 119 may be the same ones as those contained in the CPU 64 in FIG. 6, or the CPU 117, the RAM 118, and the ROM 119 may be provided separately from the CPU, the RAM, and the ROM in the CPU 64 in FIG. 6.

FRONT PANEL (FIG. 19)

Figure 19:
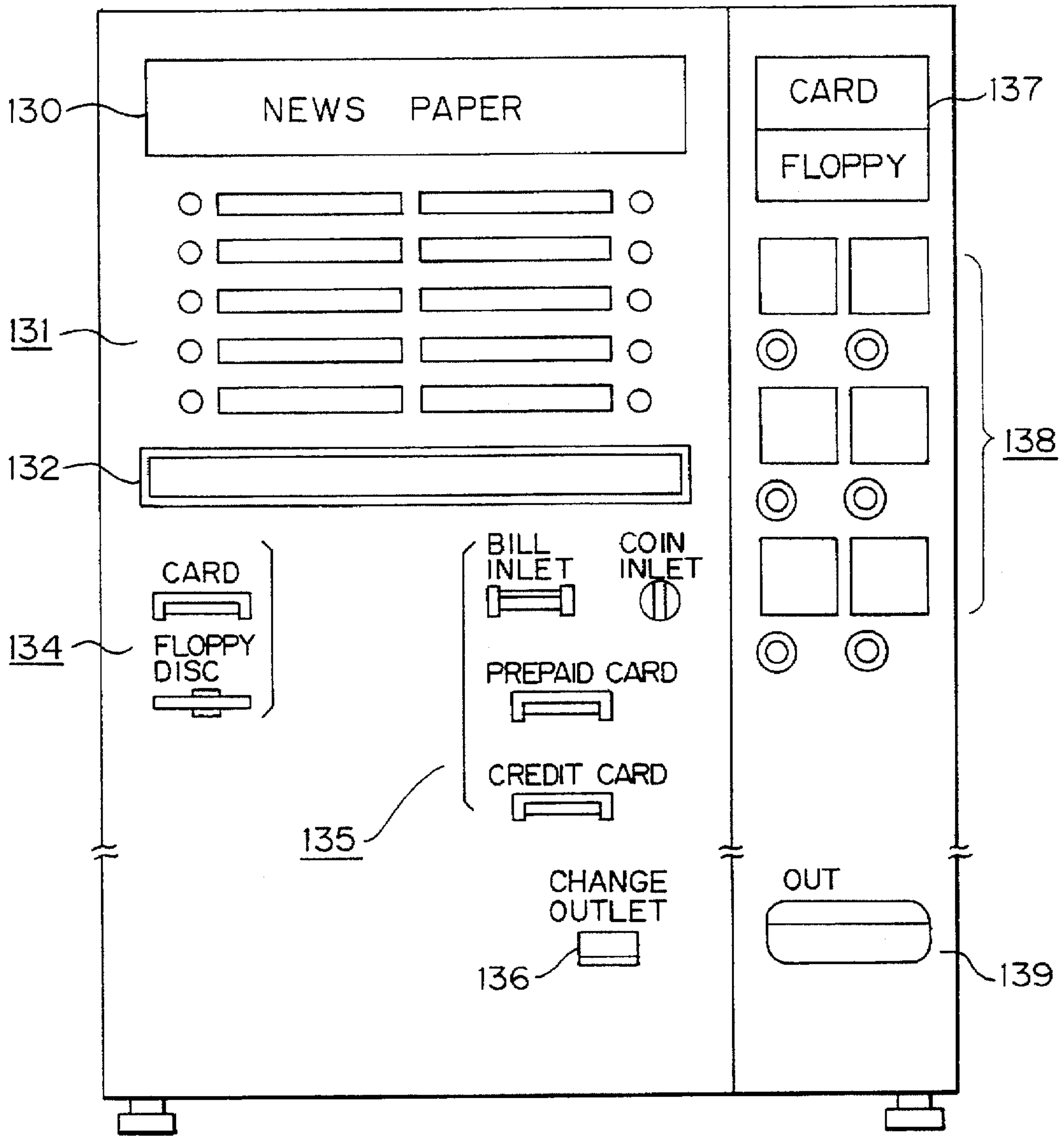
FIG. 19 illustrates a front panel of the automatic information vending machine as the embodiment of the present invention.

FIG. 19 illustrates an example of a front panel of the automatic information vending machine as the embodiment of the present invention. In FIG. 19, reference numeral 130 denotes a display for indicating what kind of information can be bought from the automatic information vending machine, for example, indicating whether or not the automatic information vending machine is vending a newspaper or a magazine; 131 denotes title selecting buttons; 132 denotes a display for indicating a message from the automatic information vending machine to a customer, for example, indicating a step of a procedure, and an amount charged for information requested by the customer; 133 denotes inlets/outlets for a memory card and a floppy disk; 135 denotes inlets/outlets for cash (bill and coin), a prepaid card, and a credit card; 136 denotes an outlet for a change; 137 denotes an indication of whether a new piece of storage medium is a memory card or a floppy disk; 138 denotes buttons for selecting a new piece of storage medium; and 139 denotes an outlet for the new piece of storage medium.

The automatic information vending machine illustrated in FIG. 19, an automatic vending machine for vending a new piece of storage medium is added to the automatic information vending machine. By using the title selecting buttons 132 and the display 131, the customer can select arbitrary items of information at arbitrary times.

Figure 20A:
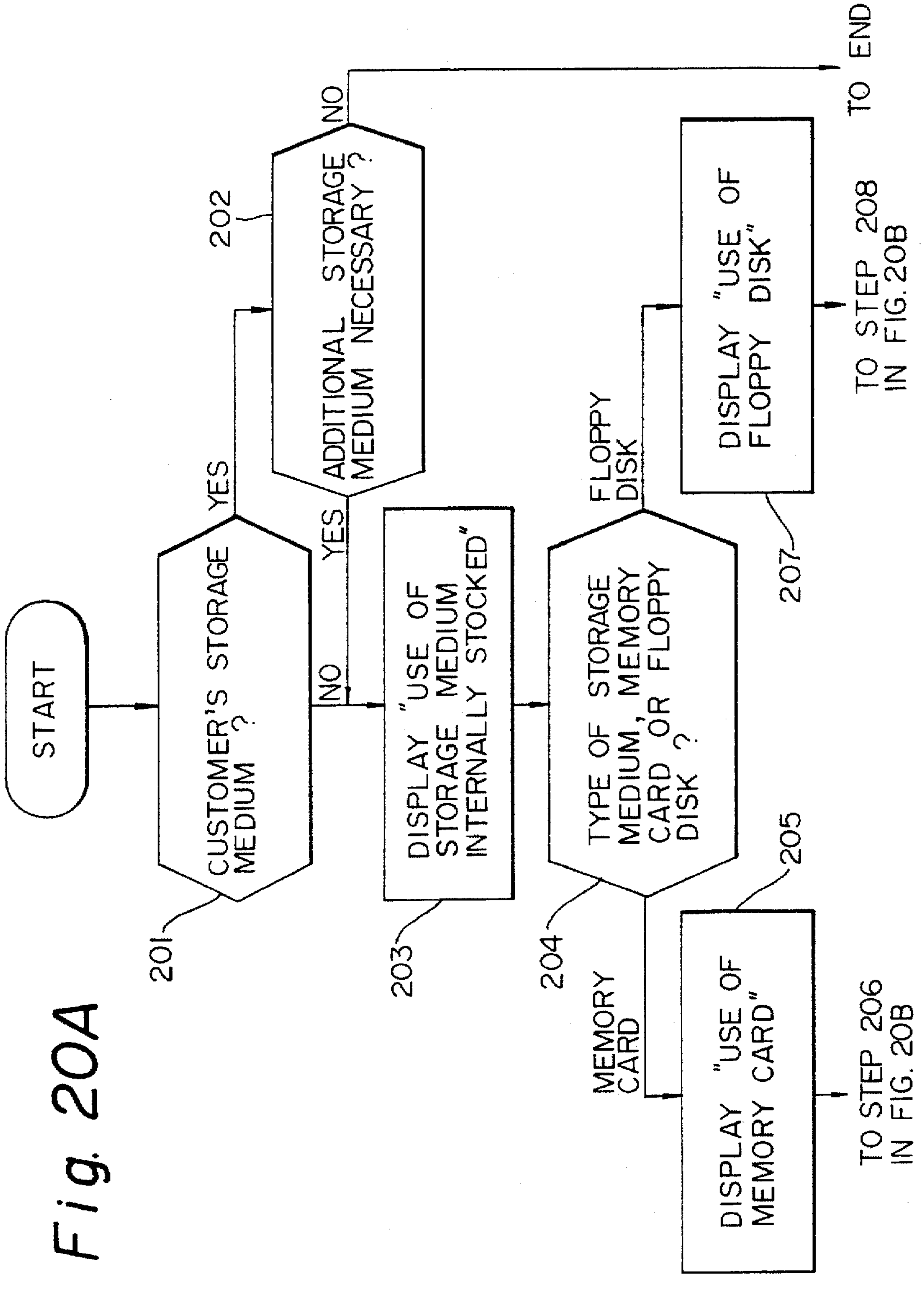
FIGS. 20A and 20B indicate an example operation of vending storage medium.
Figure 20B:
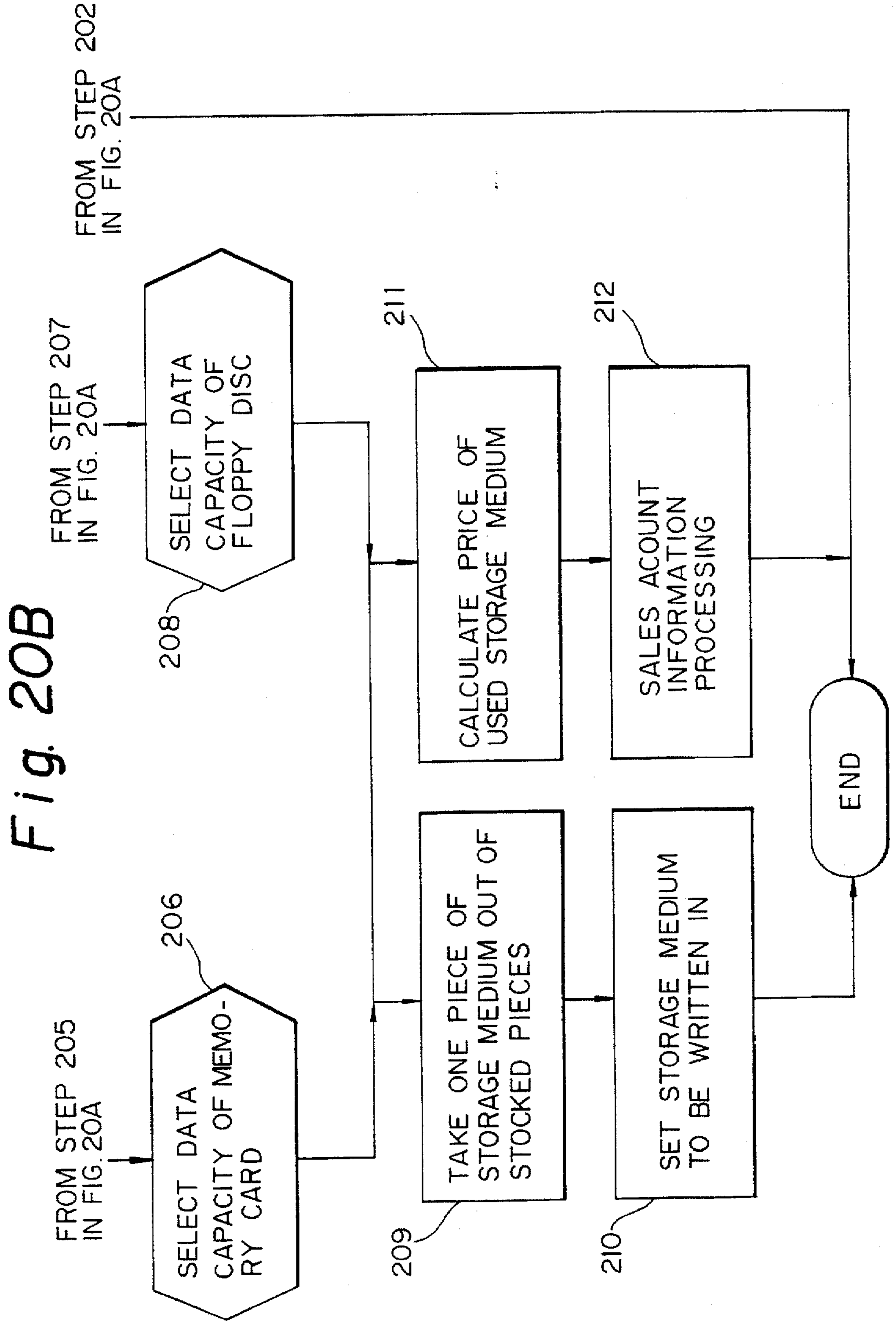

VENDING STORAGE MEDIUM (FIGS. 20A and 20B)

FIGS. 20A and 20B indicate an example operation of vending storage medium. In the example of FIGS. 20A and 20B, the automatic information vending machine has a function to receive a piece of storage medium inserted by a customer, has a stock of at least one piece of storage medium, and automatically determines necessity of use of a piece of storage medium stocked in the automatic information vending machine. In addition, the automatic information vending machine in FIGS. 20A and 20B provides the customer with options for the type of storage medium, and options for data capacity of the storage medium. Further, the automatic information vending machine has a function to automatically set a piece of storage medium selected by the customer, at a place (the data writing unit 115 in FIG. 16) at which information requested by the customer is written in the piece of storage medium.

In step 201 in FIG. 20A, it is determined whether or not the customer's piece of storage medium is inserted into the automatic information vending machine. When yes is determined in step 201, the operation goes to step 202, and it is determined whether or not an additional piece of storage medium is necessary. When yes is determined in step 202, or when no is determined in step 203, the operation goes to step 204, and a message that "a piece of storage medium which is stocked in the automatic information vending machine is being used for writing requested information therein" is displayed on the front panel. Then, the operation goes to step 204 to determine what is the type of the storage medium, for example, which type the storage medium is, a memory card or a floppy disk. When the memory card is determined in step 204, the operation goes to step 205 to display a message that "a memory card is being used", on the front panel. When the floppy disk is determined in step 204, the operation goes to step 207 to display a message that "a floppy disk is being used", on the front panel. After step 205, the operation goes to step 206 in FIG. 20B to select data capacity of the memory card among a plurality of options for data capacity. After step 207, the operation goes to step 208 in FIG. 20B to select data capacity of the memory card among a plurality of options for data capacity. After the operation in step 206 or 208, the operations in steps 209 and 210 and the operations in steps 211 and 212 are carried out. In step 209, one piece of storage medium selected as above is taken out of a place at which the pieces of storage medium are stocked. Then, in step 210, the piece of storage medium is set at the data writing unit 115 in FIG. 16. In step 211, a charge for the used piece of storage medium is calculated, and sales account information processing is carried out including a received payment from the customer in step 212. The operation for receiving payment is explained below with reference to FIGS. 22A to 22E.

Figure 21A:
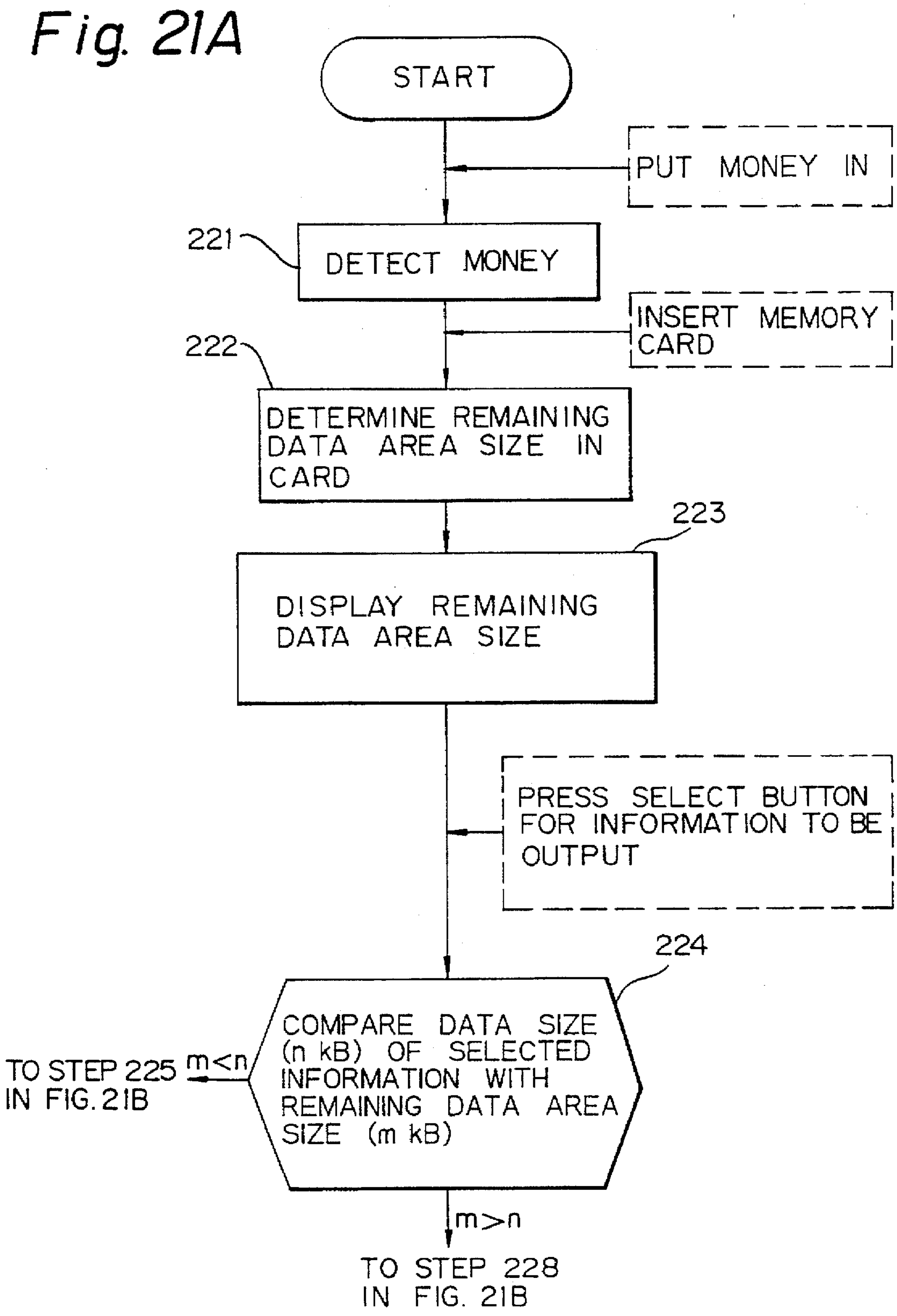
FIGS. 21A and 21B indicate an example operation of writing data in the storage medium.
Figure 21B:
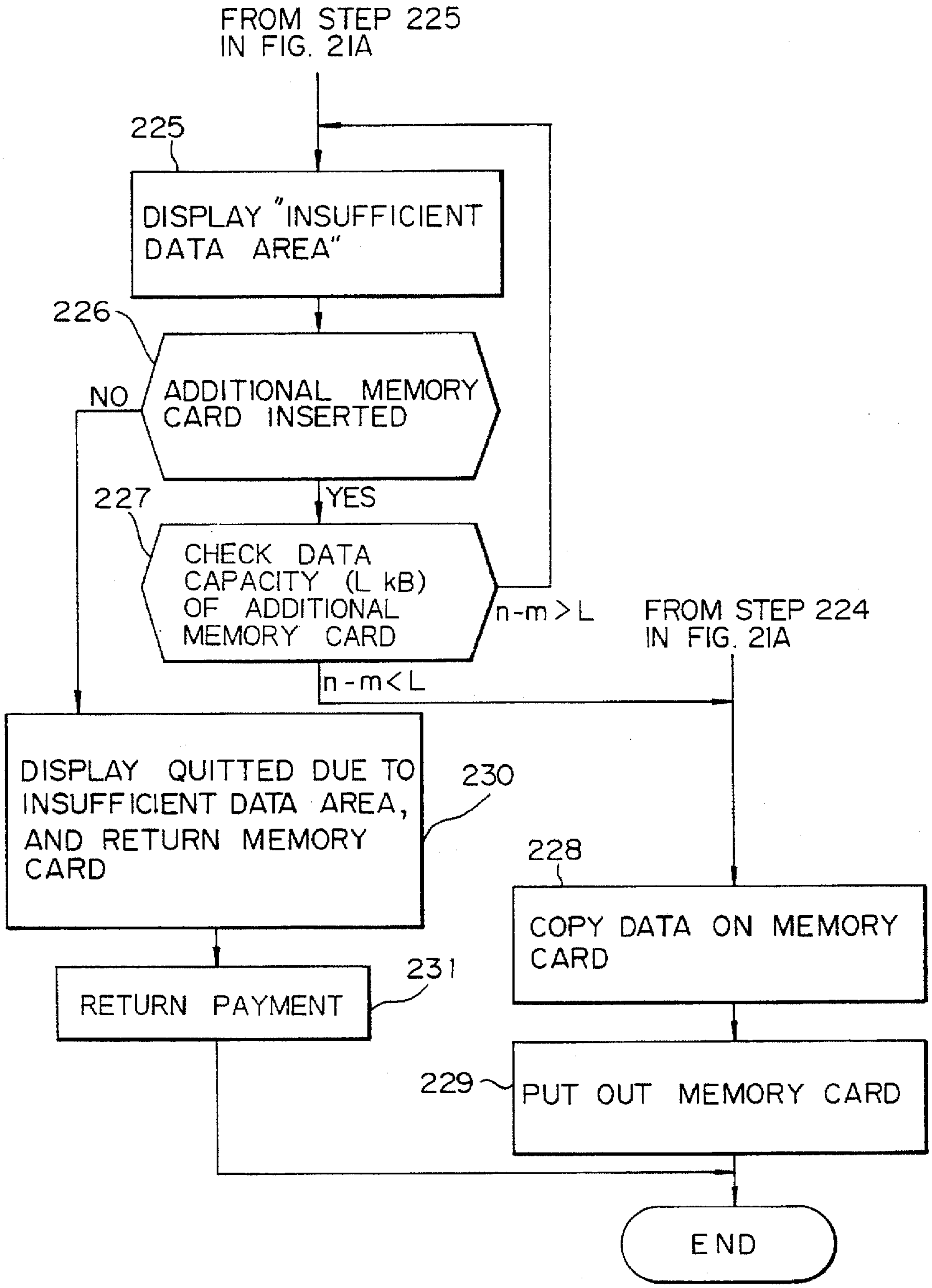

DATA WRITING IN STORAGE MEDIUM (FIGS. 21A to 21B)

FIGS. 21A and 21B indicate an example operation of writing data in the storage medium. In step 221 in FIG. 21A, reception of a payment of the charge for the information to be written in the storage medium, is detected. Then, after the customer inserts a piece of storage medium (for example, a memory card), the remaining (available) data area size in the inserted piece of storage medium is determined in step 222, and the determined remaining (available) data area size is displayed on the front panel. After the customer presses one of buttons (for example, the buttons 131 in FIG. 19) to select one of a plurality of items of information provided in the automatic information vending machine, the data size (n kilobytes) of the selected item of information is compared with the above remaining (available) data area size (m kilobytes) in the inserted piece of storage medium in step 224. When it is determined that the data size (n kilobytes) of the selected item of information is greater than the remaining (available) data area size (m kilobytes) in the inserted piece of storage medium, the operation goes to step 225 in FIG. 21B. When it is determined that the data size (n kilobytes) of the selected item of information is smaller than the remaining (available) data area size (m kilobytes) in the inserted piece of storage medium, the operation goes to step 228 in FIG. 21B. In step 225, a message that "the remaining data area in the inserted piece of storage medium is insufficient to write the selected information therein" is displayed on the front panel. In step 226, it is determined whether or not an additional piece of storage medium is inserted in the automatic information vending machine. When no is determined in step 226, the operation goes to step 230 to display a message that "the operation has quit since the available data area size in the inserted piece of storage medium is insufficient to write the selected information therein" on the front panel, and the payment is returned in step 231. When yes is determined in step 226, the operation goes to step 227 for examining the additional piece of storage medium to determine the data capacity (L kilobytes) of the additional piece of storage medium. When it is determined that the data capacity (L kilobytes) of the additional piece of storage medium is smaller than the difference between the data size (n kilobytes) of the selected item of information and the remaining (available) data area size (m kilobytes) in the inserted piece of storage medium, the operation goes to step 225. When it is determined that the data capacity (L kilobytes) of the additional piece of storage medium is not smaller than the difference between the data size (n kilobytes) of the selected item of information and the remaining (available) data area size (m kilobytes) in the inserted piece of storage medium, the operation goes to step 228. In step 228, the selected information is written in the piece of storage medium, and then the piece of storage medium is eject from the automatic information vending machine in step 229.

RECEIVING PAYMENT OF CHARGE (FIGS. 22A to 22E)

FIGS. 22A to 22E indicate an example operation of receiving payment of a charge. In step 241, a charge for the selected item of information is displayed on the front panel. In step 242, it is determined what the payment of the charge is to be made by, a prepaid card, a credit card, or cash. When it is determined that the payment of the charge is to be made by a prepaid card or card, the operation goes to step 243 to wait for payment of the charge. Then, in step 244, it is determined what the payment of the charge is made by, a prepaid card or cash. When it is determined that the payment is made by cash, the operation goes to step 245 to sort bills and coins which the customer puts into the automatic information vending machine. In step 246, the paid money is examined for a fault. When it is determined that the money is faulty in step 246, the operation goes to step 247 to return the faulty money, and goes back to step 243. When it is determined that the money is good in step 246, the operation goes to step 248. In step 248, the paid money is counted. Then, the operation goes to step 256 in FIG. 22D. When it is determined that the payment is made by a prepaid card, the operation goes to step 249 to examine the prepaid card for a fault. When it is determined that the prepaid card is good in step 249, the operation goes to step 250 to determine the remainder of the prepaid card. Then, the operation goes to step 256 in FIG. 22D. When it is determined that the prepaid card is faulty in step 249, the operation goes to step 261 in FIG. 22E. In step 261 in FIG. 22E, the fault of the prepaid card is indicated on the front panel. Next, the faulty prepaid card is returned in step 262, and a message that "payment by cash or another prepaid card is requested" is displayed on the front panel. Then, the operation goes back to step 241.

Figure 22A:
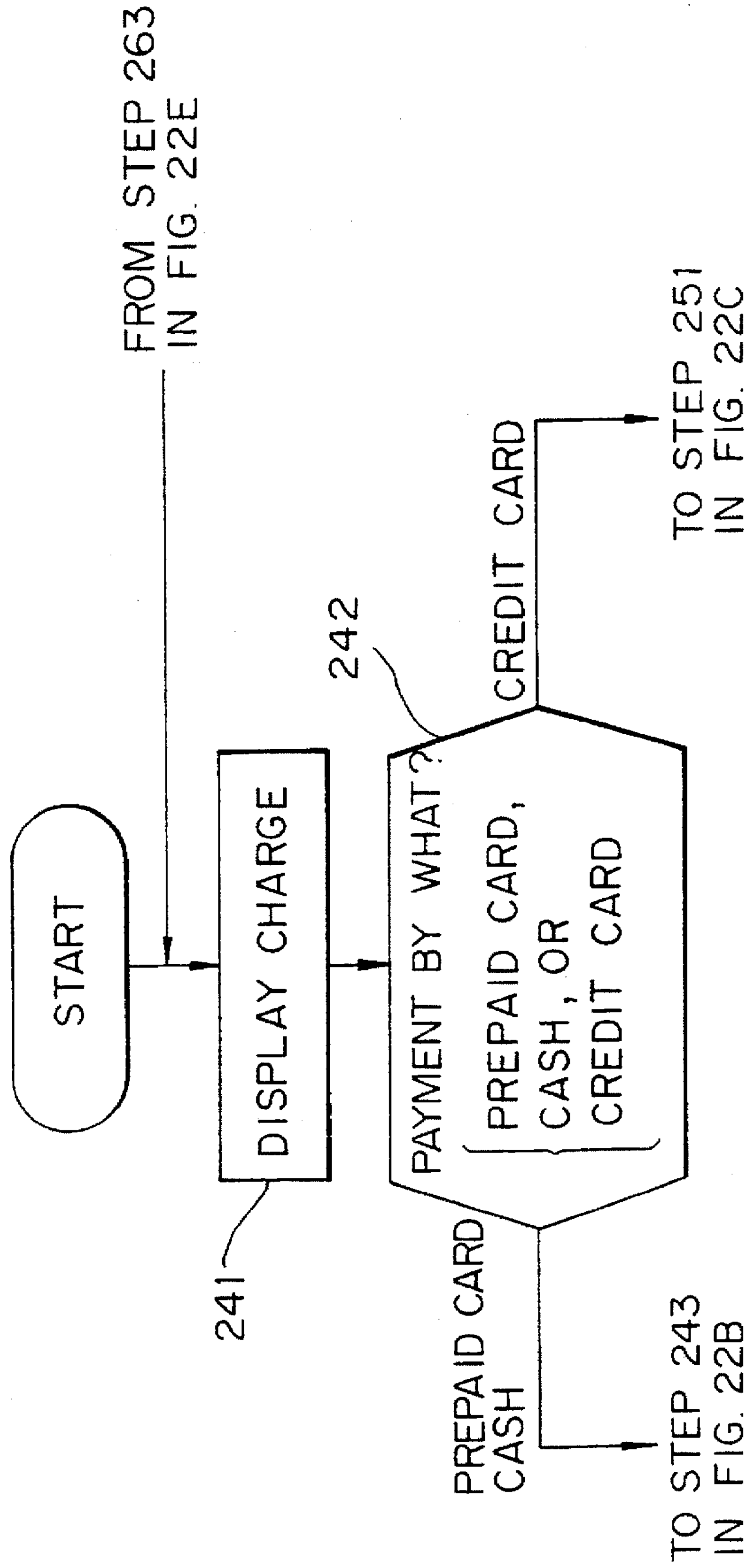
FIGS. 22A to 22E indicate an example operation of receiving payment of a charge.
Figure 22B:
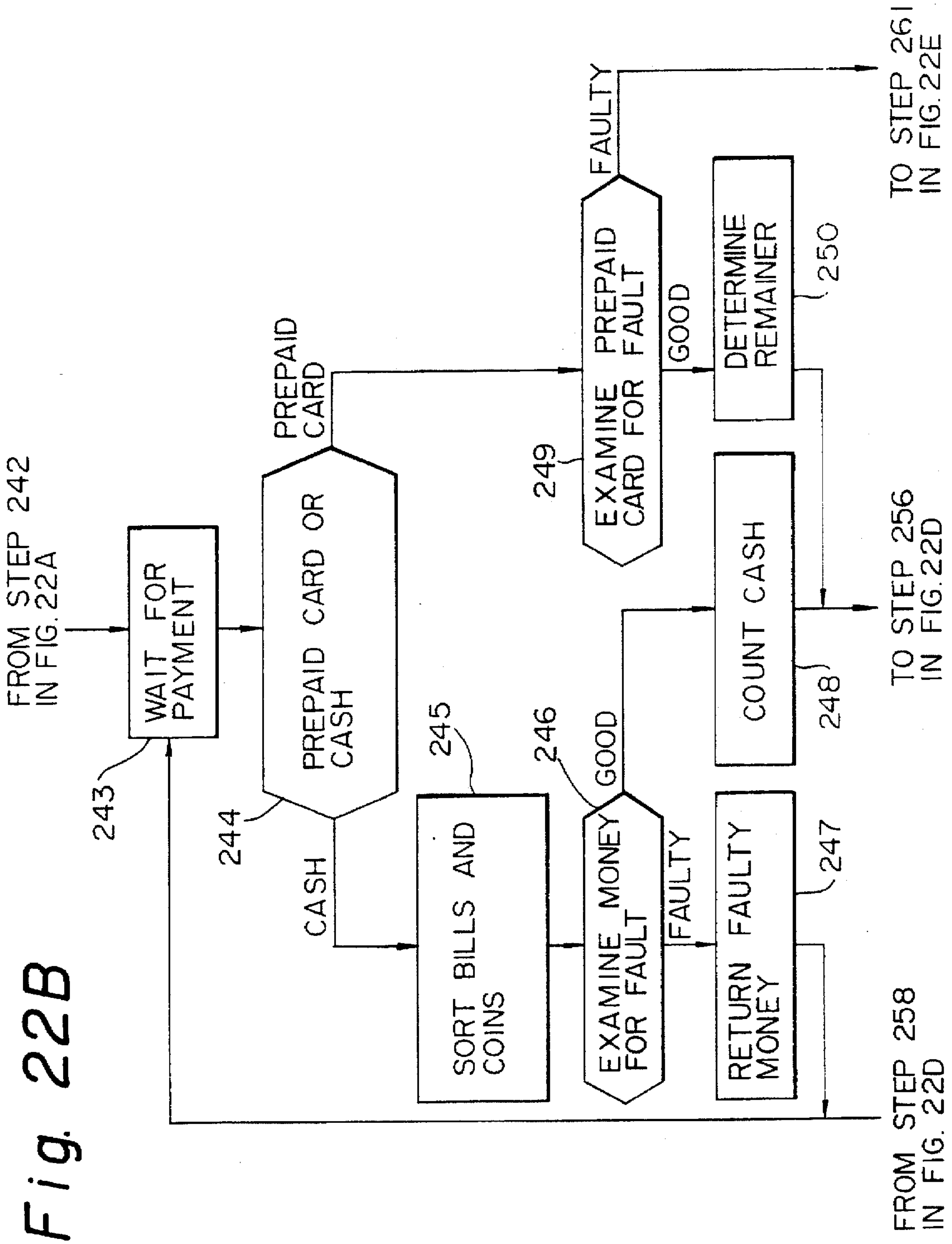
Figure 22C:
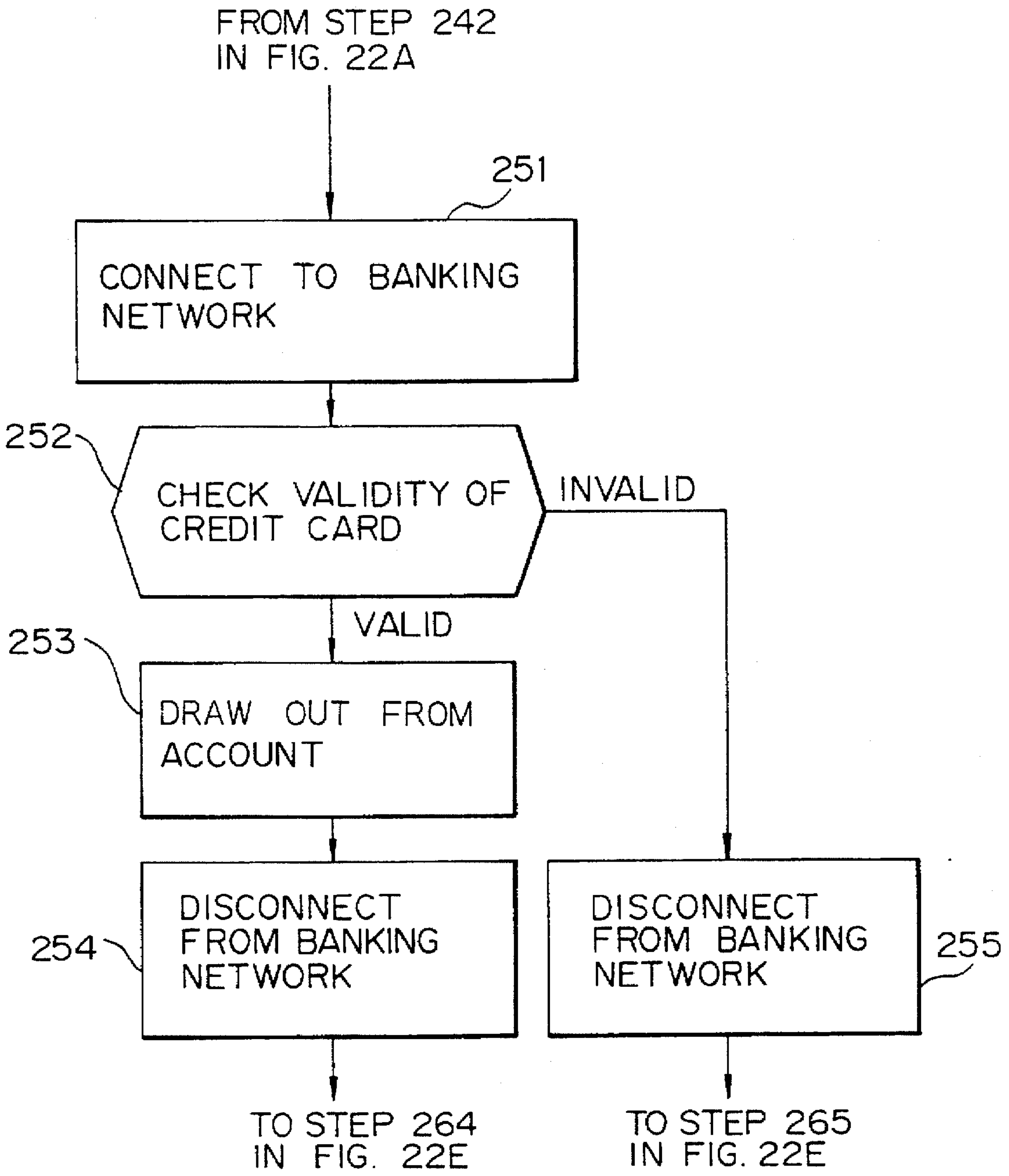
Figure 22D:
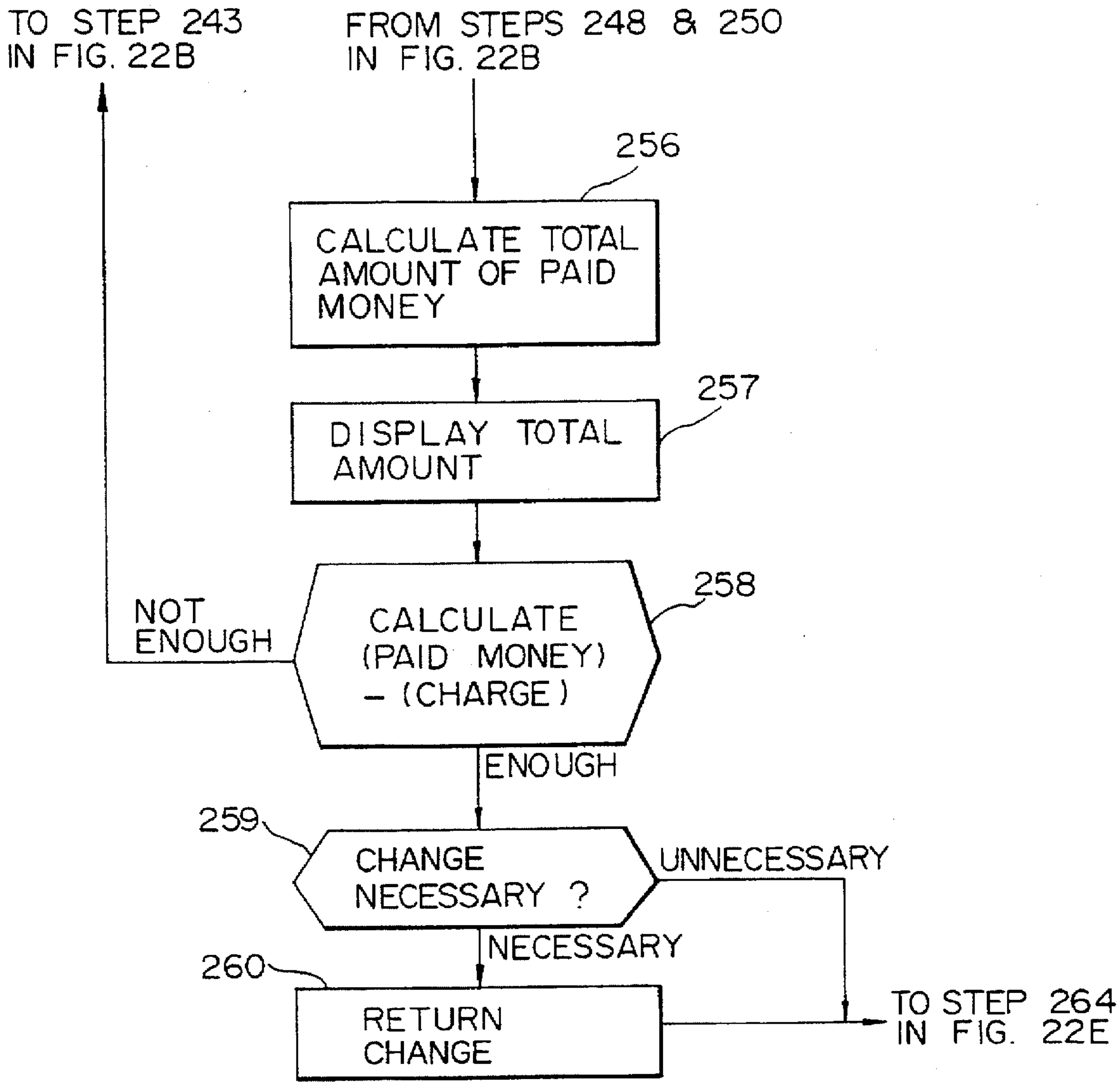

In step 256 in FIG. 22D, the total amount of the paid money is obtained by calculation. Then, the total amount is displayed on the front panel in step 257. Next, in step 258, the difference between the paid money and the charge for the selected information is calculated. When the difference is negative, i.e., the paid money is not enough for the charge, the operation goes back to step 243 in FIG. 22B. When the difference is zero or positive, i.e., the paid money is enough for the charge, the operation goes to step 259. In step 259, it is determined whether or not a change is necessary. When it is determined that the change is unnecessary in step 259, the operation goes to step 264 in FIG. 22E. When it is determined that the change is necessary in step 259, the change is returned in step 260, and then the operation goes to step 264 in FIG. 22E.

When it is determined that the payment of the charge is to be made by a credit card in step 242 in FIG. 22A, the operation goes to step 251 in FIG. 22C. In step 251, the CPU 64 in FIG. 6 is connected with a banking network to access a banking system, and then the credit card is examined for validity in step 252. When it is determined that the credit card is not valid in step 252, the CPU 64 is disconnected from the banking system in step 255. Then, the operation goes to step 265 in FIG. 22E. In step 265 in FIG. 22E, the invalidity of the credit card is indicated on the front panel. Next, the faulty prepaid card is returned, and a message that "payment by means other than the credit card is requested" is displayed on the front panel. Then, the operation goes back to step 241. When it is determined that the credit card is valid in step 252, the operation goes to step 253 to draw out the charged amount from an account of the customer. Next, the CPU 64 is disconnected from the banking system in step 254, and the operation goes to step 264 in FIG. 22E.

Figure 22E:
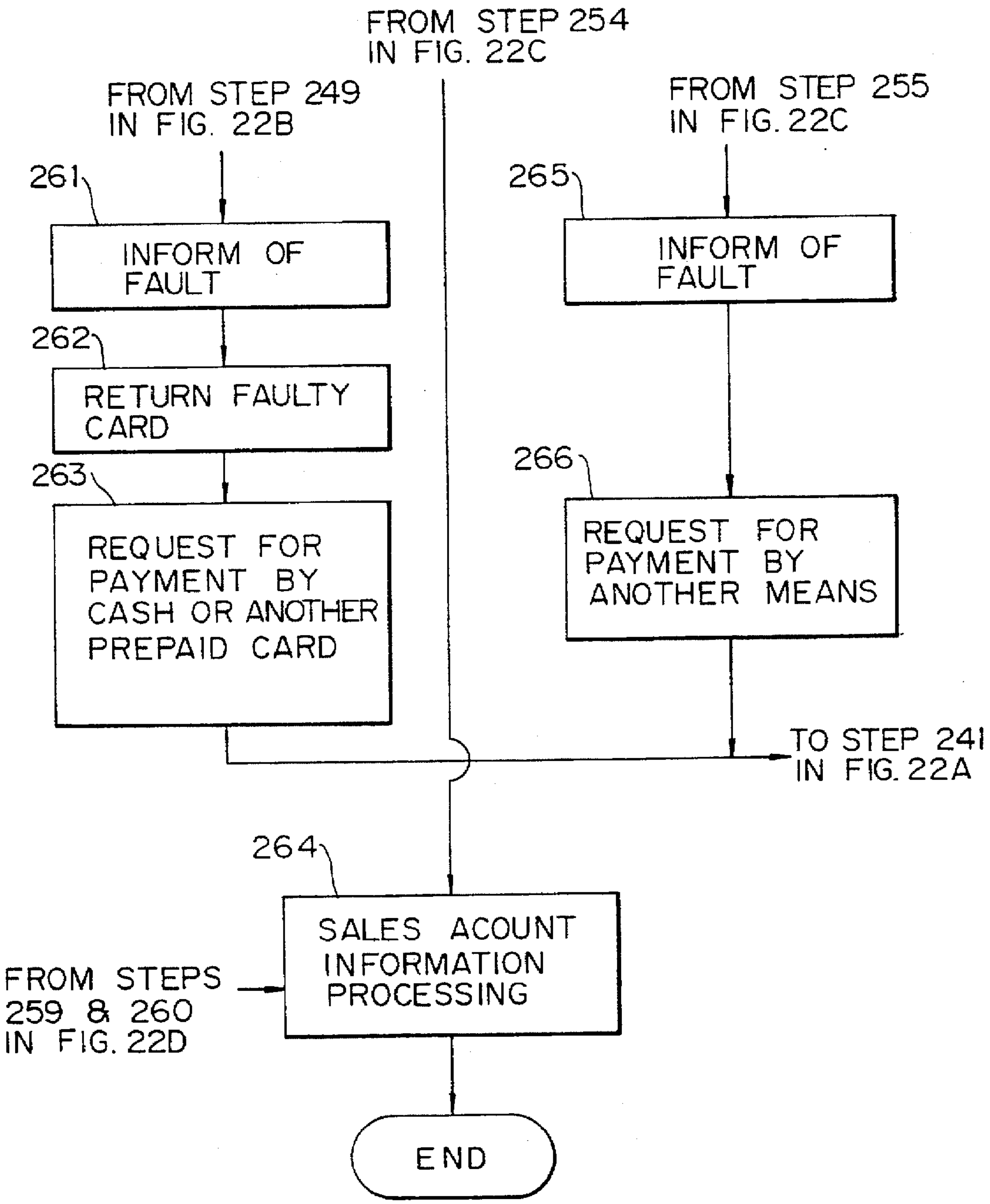

In step 264 in FIG. 22E, sales account information processing is carried out including a received payment from the customer, and the operation is ended.

Figure 23A:
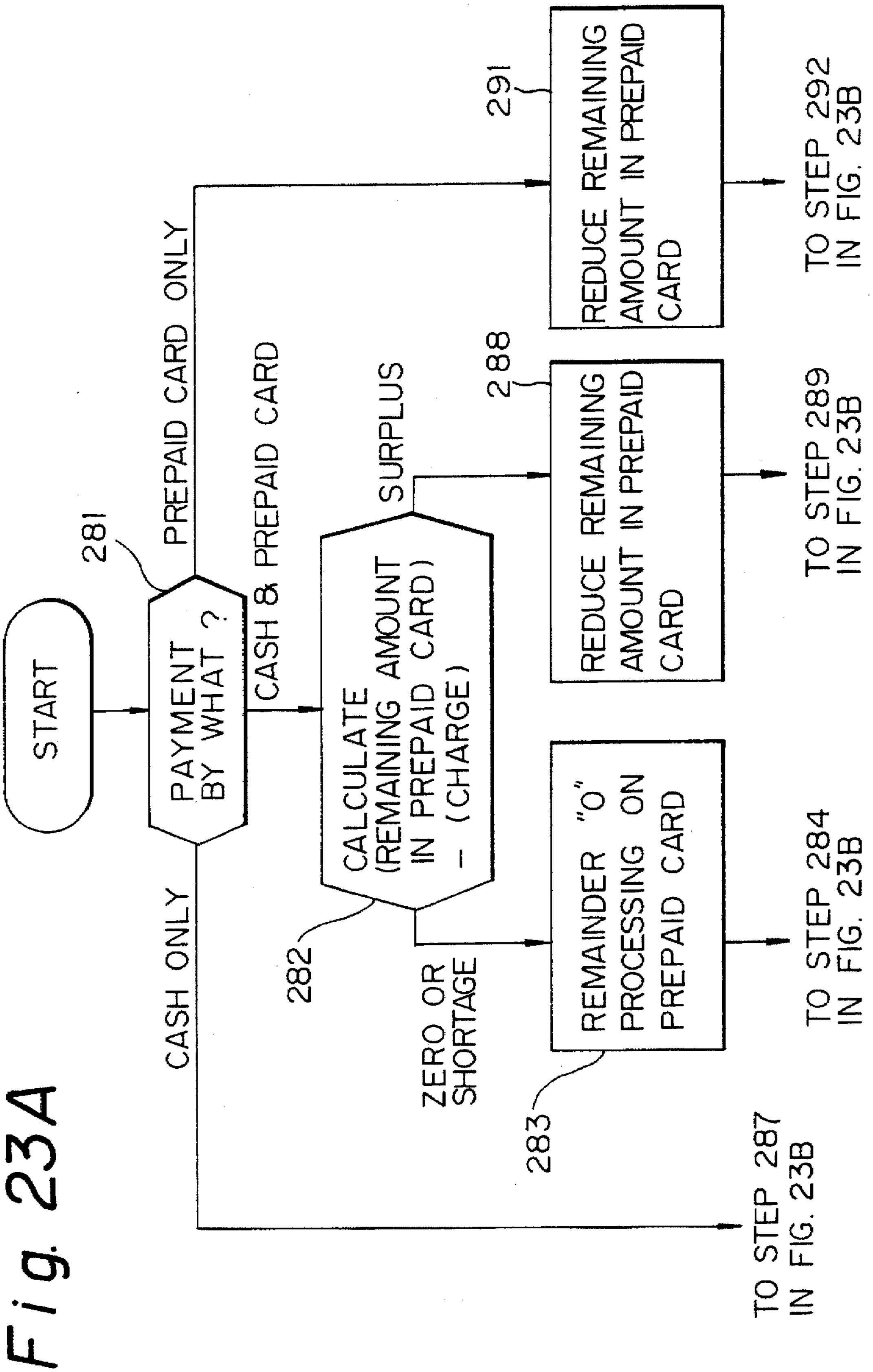
FIGS. 23A and 23B indicate an example operation of returning change.
Figure 23B:
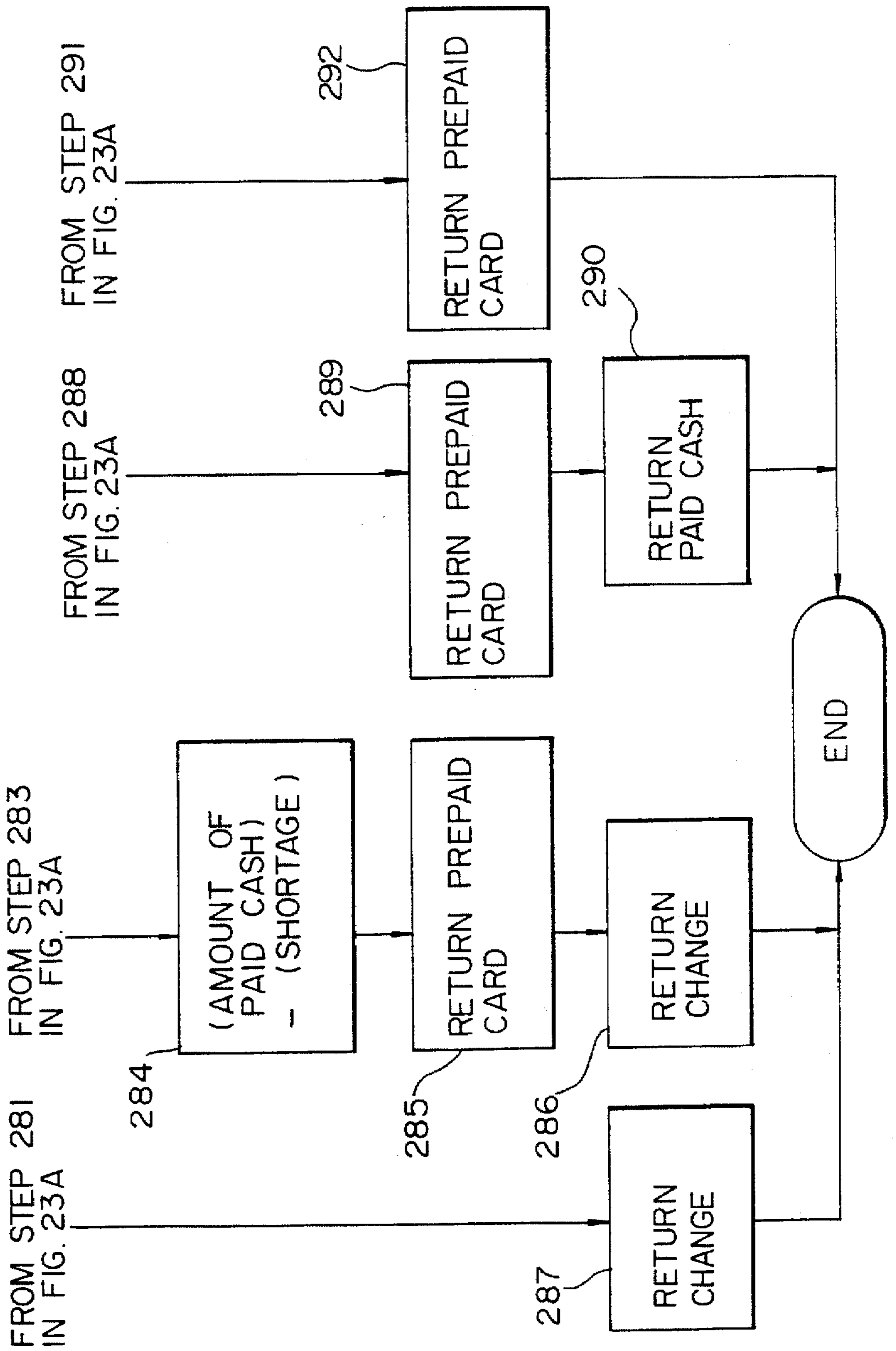

RETURN OF CHANGE (FIGS. 23A and 23B)

FIGS. 23A and 23B indicate an example operation of returning change. In step 281 in FIG. 23A, it is determined what the payment of the charge is to be made by, a prepaid card only, cash only, or a prepaid card and cash. When it is determined that the payment of the charge is to be made by cash only, the operation goes to step 287 in FIG. 23B to return the change by cash. When it is determined that the payment of the charge is to be made by a prepaid card only, the operation goes to step 291 to reduce the amount in the prepaid card by the charged amount. Next, the prepaid card is returned in step 292 to end the operation. When it is determined that the payment of the charge is to be made by a prepaid card and cash, the operation goes to step 282 to calculate the difference between the remaining amount in the prepaid card and the charged amount. When it is determined in step 282 that the calculated difference is negative (i.e., there is a shortage) or zero, the operation goes to step 283. In step 283, a process to make the prepaid card into a "remainder zero" state is performed, and then an amount of a change is obtained in step 284 by calculating the difference between an amount of the received money and the shortage. Next, the prepaid card is returned in step 285, and the change is returned in step 286.

When it is determined in step 283 that the calculated difference is positive, the operation goes to step 288 to reduce the amount in the prepaid card by the charged amount. Next, the prepaid card is returned in step 289, and the received money is returned in step 290.

TYPES OF STORAGE MEDIUM

In the information delivering and vending system wherein the automatic information vending machine according to the present invention is used, two types of storage medium can be used. In the first type, any kind of information can be written therein without limitation. In the second type of storage medium, only one or more specific kinds of information can be written therein. In the second type of storage medium, information indicating the specific kinds which are allowed to be written therein and an available period is written in advance. In the automatic information vending machine provided in the information delivering and vending system using the above first and second types of storage medium, the CPU 64 in FIG. 6 can discriminate the second type from the first type by the above information. When the automatic information vending machine receives a piece of storage medium of the second type, the CPU 64 in FIG. 6 reads the information on the allowed kinds and the available period, before performing the operation of step 222 in FIG. 21A, and vends the selected information with no charge when the selected information is one of the specific kinds, and the available period is not expired. In addition, when writing information in a piece of storage medium, the CPU 64 reads a version of information which is already written in the piece of storage medium, and compares the version with a version of corresponding information stored in the storage unit 55. When the version of the information in the piece of storage medium is the same as the version of the information in the storage unit 55, the information is not written in the piece of storage medium. When the version of the information in the storage unit 55 is newer than the version of the information in the piece of storage medium, the information of the newer version is written in the piece of storage medium with no charge when the available period is not expired.

For example, when a customer has a piece of storage medium in which information indicating allowance to buy pages on economic news in a newspaper for one month is written, the customer can buy the version 0 information in the pages from an automatic information vending machine placed in a station in the morning. Then, if a next version of the same kind of information is not transmitted to automatic information vending machines placed at various places when the customer tries to buy the next version of the information from another automatic information vending machine placed near his office at noon, the operation of writing the information is not performed on the piece of storage medium, and the CPU 64 displays a message that the version of the selected information stored in the automatic information vending machine is the same as the version written in the piece of storage medium. If the next version of the same kind of information has been transmitted to the automatic information vending machines placed at the various places when the customer tries again to buy the next version of the information from the automatic information vending machine placed near his office in the afternoon, the next version of the information is written in the piece of storage medium with no charge.

LIMITING KINDS OF VENDED INFORMATION

Each automatic information vending machine, can be preset so that the automatic information vending machine receives information transmitted from a communications satellite only when the information is of one or more specific kinds. The operation of presetting the automatic information vending machine as above is performed by transmitting a command from the information transmission center through a communication network on the ground or through the communications satellite to the automatic information vending machine, or by manually presetting the automatic information vending machine.

To realize the operation, the automatic information vending machine can comprise a register or an area of a memory in which information on the above one or more specific kinds is stored, and when information is transmitted from the communications satellite to the automatic information vending machine, the CPU 64 should determine whether or not the transmitted information is equal to one of the above one or more specific kinds. The kind can be discriminated by decoding the "INFORMATION CODE" in the format of FIG. 4 in the control signal discrimination circuit 84 in FIG. 7B. Alternatively, the kind can be detected by any combination of the "IP CODE", and the "DATA CODE".

Otherwise, the above limitation condition can be fixedly set in each automatic information vending machine by modifying the descramble circuit 83 in FIG. 7B so that the descramble circuit 83 can descramble only information containing a specific "IP CODE". In this case, on a transmitter side, the manner of scrambling is changed for information containing each "IP CODE".

TIMER FUNCTION

The automatic information vending machine can comprise a function to initialize the automatic information vending machine when it is determined that a customer has quit his or her operation for buying information. In the following cases (i) to (iii), it is determined that the customer quit the operation.

(i) The operation by the customer is not completed within a predetermined time.

(ii) An expected operation by the customer is not commenced within a predetermined time after a message prompting the customer's operation is displayed on the front panel.

(iii) The customer performs an operation that indicates quitting the operation, for example, by pressing a stop button when the stop button is provided on the front panel.

INFORMING OF AN ALARM (FIGS. 24 to 27)

Figure 24A:
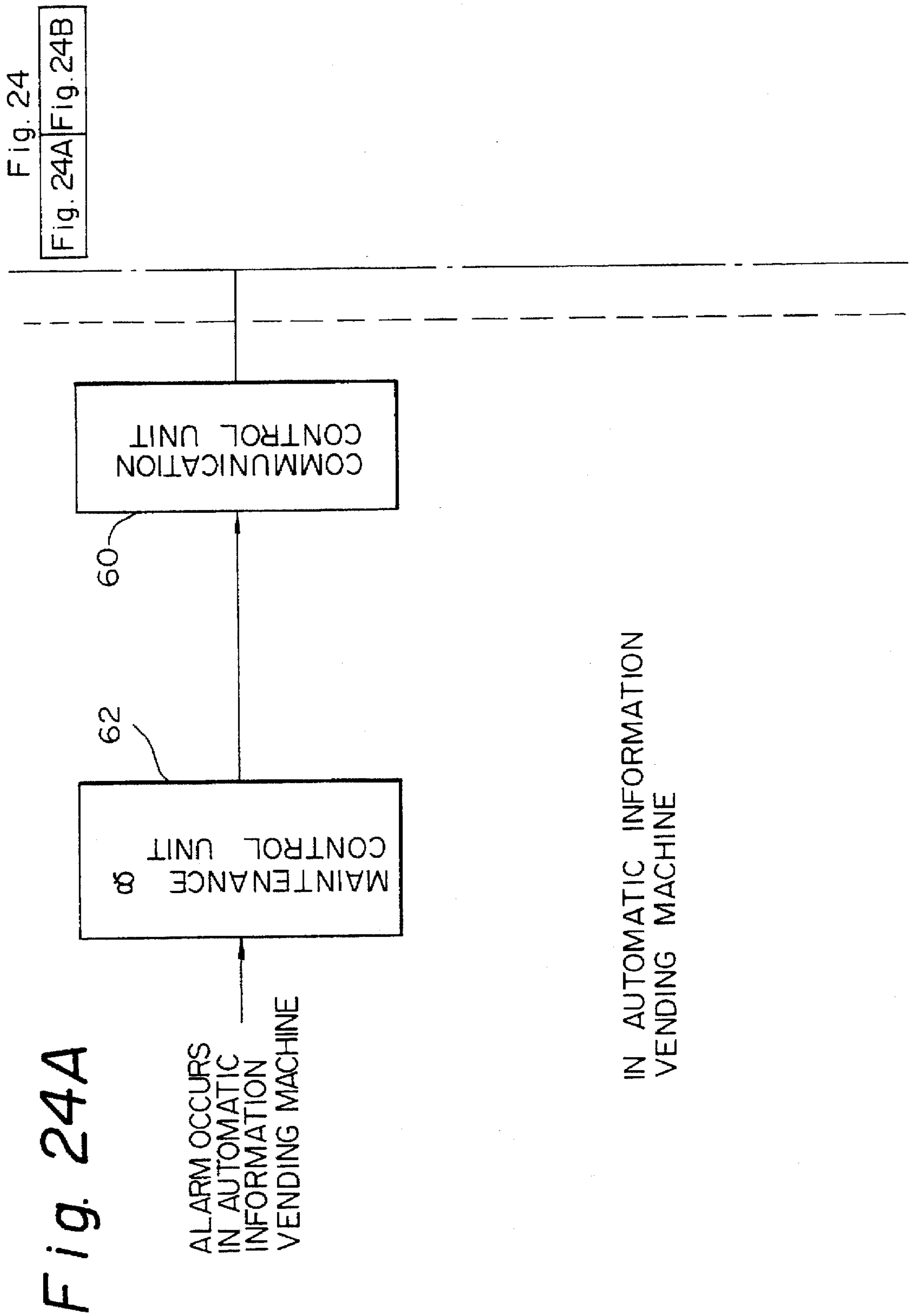
FIG. 24 (a composite of FIGS. 24*a* and 24*b*) is a block diagram indicating a system for informing of an occurrence of an abnormal situation of the automatic information vending machine.
Figure 24B:
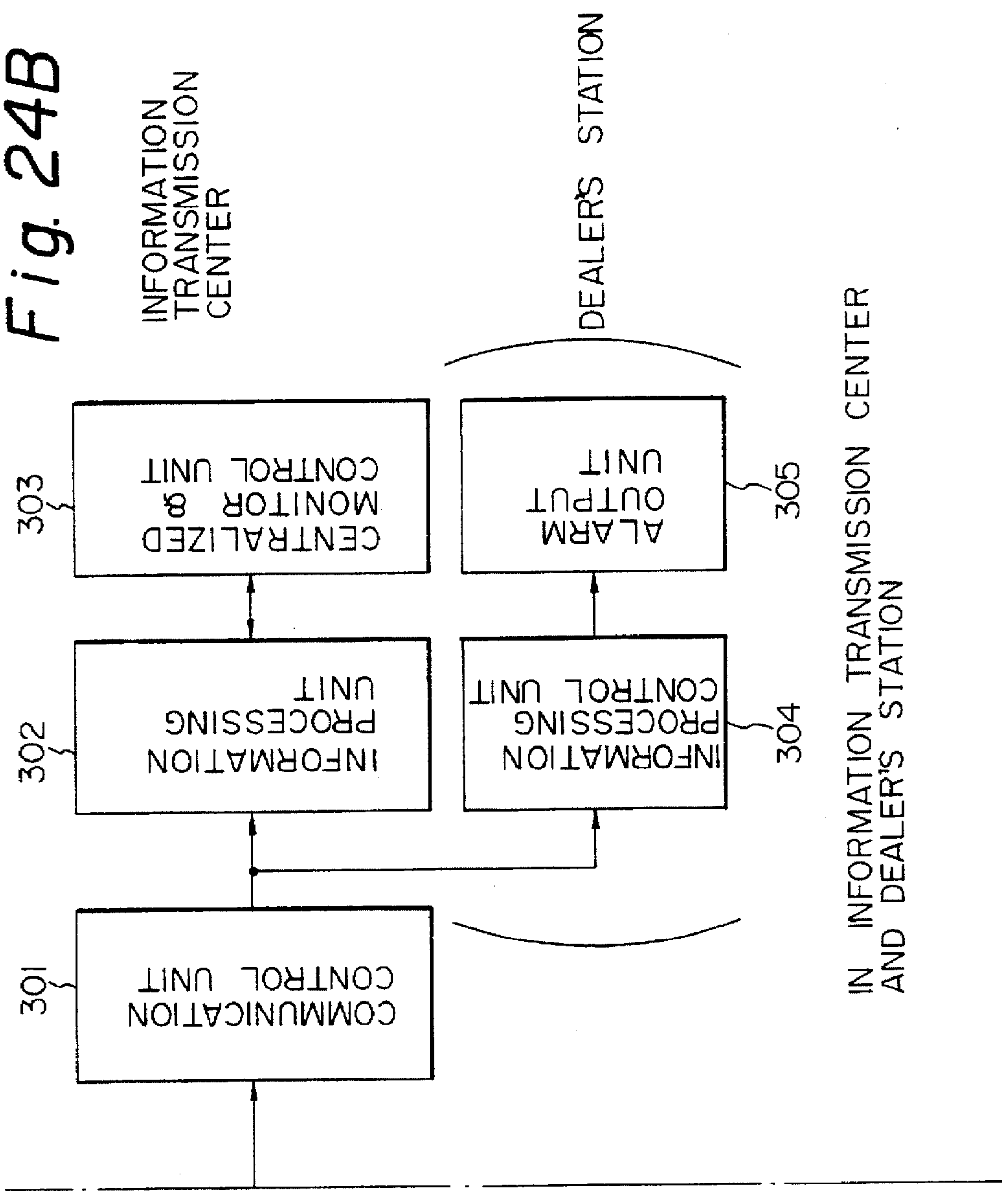

FIG. 24 is a block diagram indicating a system for informing of an occurrence of an abnormal situation of the automatic information vending machine. In FIG. 24, reference numeral 60 denotes the communication control unit in the automatic information vending machine, as indicated in FIG. 6; 62 denotes a maintenance & control unit; 301 denotes a communication control unit in an information transmission center or a dealer's station; 302 denotes an information processing unit; 303 denotes a centralized monitor & control unit; 304 denotes an information processing control unit; and 305 denotes an alarm output unit.

Figure 25:
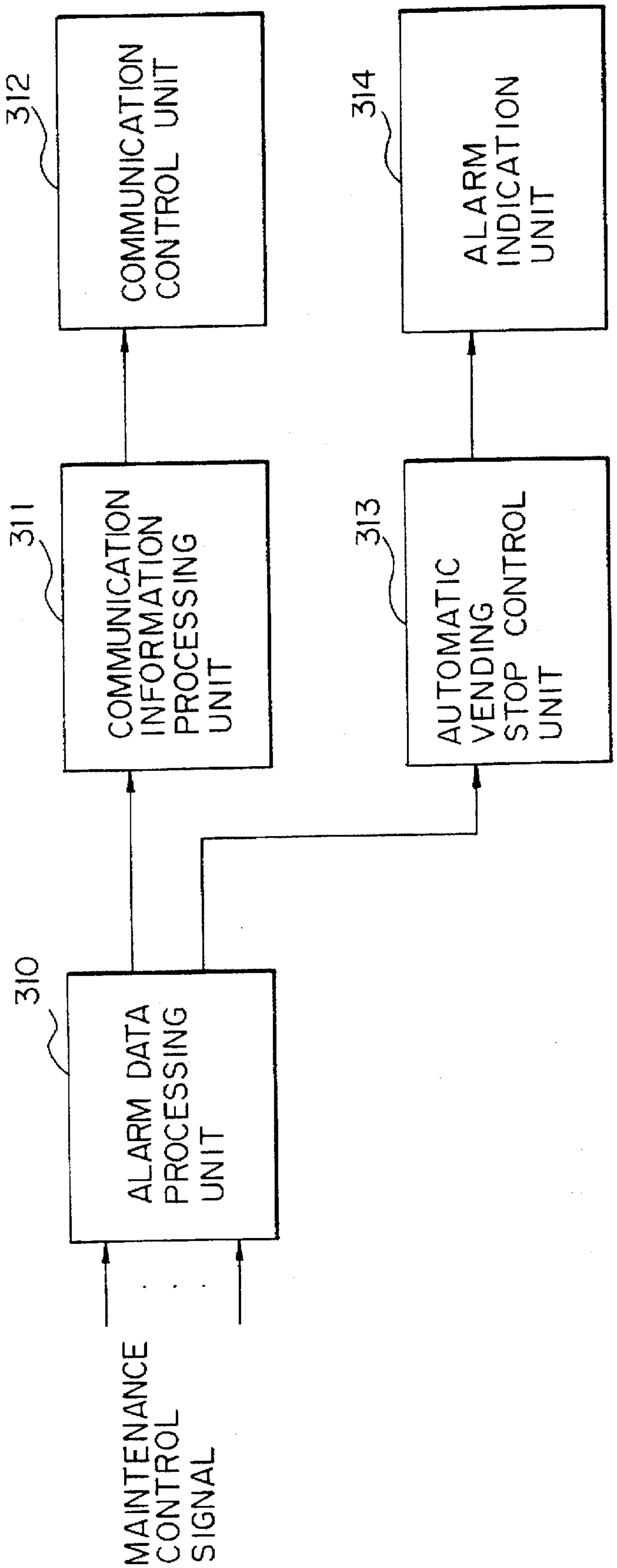
FIG. 25 is a block diagram indicating a construction within the automatic information vending machine, for informing of an occurrence of an abnormal situation of the automatic information vending machine.

Further, FIG. 25 is a block diagram indicating a construction within the automatic information vending machine, for informing of an occurrence of an abnormal situation of the automatic information vending machine. In FIG. 25, reference numeral 310 denotes an alarm data processing unit, 311 denotes a communication information processing unit, 313 denotes an automatic vending stop control unit, and 314 denotes an alarm indication unit.

Various operations of the automatic information vending machine are monitored, and when an abnormality is detected, an alarm signal is generated and supplied to the alarm data processing unit 310 as one of a plurality of maintenance control signals. Receiving the alarm signal, the alarm data processing unit 310 sends control signals respectively for controlling the communication information processing unit 311 to generate alarm data to be transmitted to the information transmission center or a dealer's station, and for controlling the automatic vending stop control unit 313 to stop the operation of the automatic information vending machine. The automatic vending stop control unit 313 further activates the alarm indication unit 314 to generates an alarm indication. The alarm data generated in the communication information processing unit 311 is transmitted to the information transmission center or the dealer's station with the aid of the communication control unit 60. The above alarm signal supplied to the communication information processing unit 311, the control signals output from the and the communication information processing unit 311, and the alarm data generated in the communication information processing unit 311 each contains information indicating what kind of abnormality is detected.

Going back to FIG. 24, the above alarm data transmitted from the automatic information vending machine is received with the aid of the communication control unit 301 in the information transmission center, is decoded in the information processing unit 302, and is then transferred to the centralized & monitor control unit 303 as information on the abnormality. When the alarm data is received in the dealer's station, the alarm data is decoded in the information processing control unit 304, and is then transferred to the alarm output unit 305 to output an alarm indication.

Figure 26:
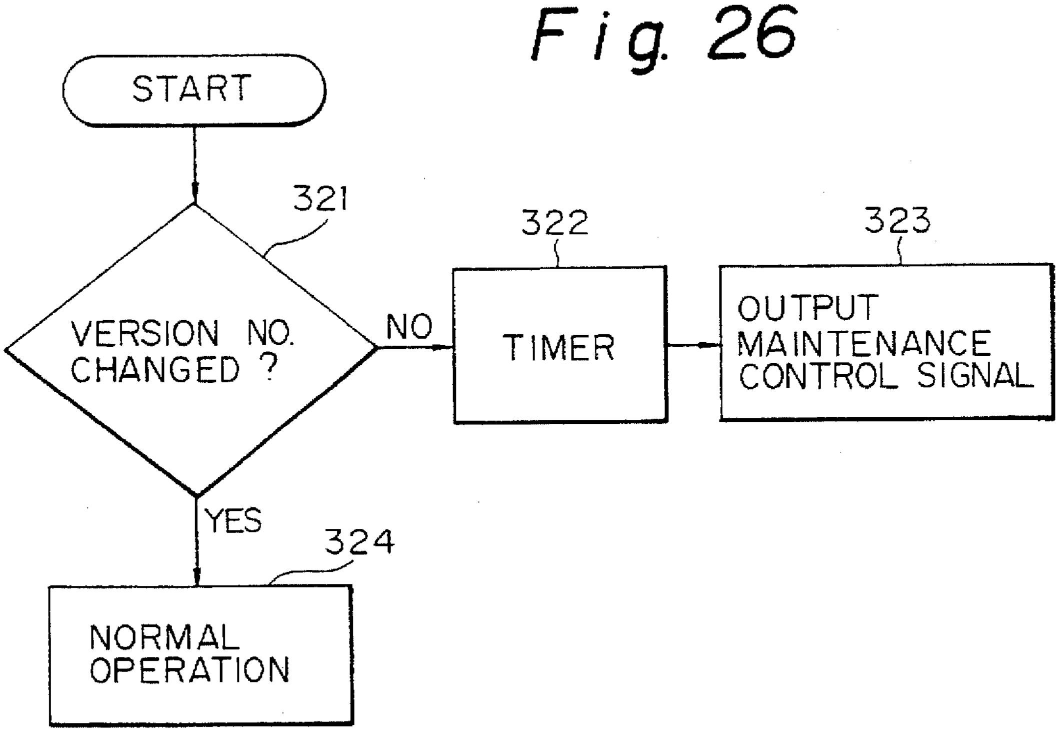
FIG. 26 indicates an example operation of detecting and informing of a lack of reception of a new version of information.

FIG: 26 indicates an example operation of detecting and informing of a lack of reception of a new version of information. The routine of FIG. 26 is started at a predetermined cycle for each kind of information. The cycle is, for example, one week in the case of information of a weekly magazine. In step 321 in FIG. 26, it is determined whether or not the version is changed on the information management table as indicated in FIG. 5. When it is determined that the version is changed, the operation goes back to the normal operation. When it is determined that the version is changed, a timer is started (step 322), and after a predetermined time, a maintenance control signal is output in step 323.

Figure 27:
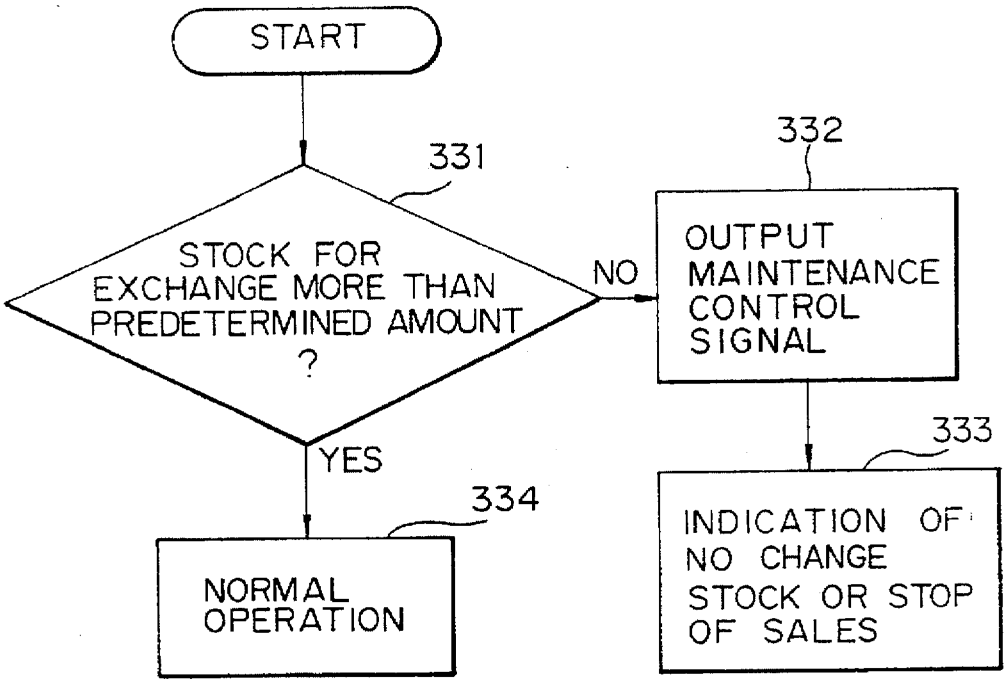
FIG. 27 indicates an example operation of detecting and informing of a state in which a stock of money to be used as change is run out.

FIG. 27 indicates an example operation of detecting and informing of a state in which a stock of money to be used as change is run out. The routine of FIG. 26 is started at a predetermined cycle. In step 331 FIG. 27, it is determined whether or not an amount of a current stock for change is more than a predetermined amount. When yes is determined in step 331, the operation goes back to the normal operation. When it is determined that the amount of the current stock for change is not more than the predetermined amount, a maintenance control signal is output, and an indication that "there is no stock for change" is activated, or the operation for vending information may be stopped.

We claim:

1. An automatic vending machine for vending information, comprising:

receiving means for receiving a signal carrying first information for sale transmitted from a communication center, said first information including at least one kind of data;

storage means for storing the first information;

purchase request input means for receiving a signal indicating a purchase order;

attribute information input means for receiving attribute information which is written on a storage medium, and indicates at least one specific kind of data is allowed to be output;

information specifying means for specifying and reading the data of said at least one specific kind, from the storage means; and outputting means for outputting the data of said at least one specific kind through an output port.

2. An automatic vending machine according to claim 1, wherein the first information received by the receiving means includes a plurality of predetermined kinds of second information and third information accompanying each kind of second information and indicating the kind;

the storage means contains a plurality of areas respectively storing different kinds of the second information;

the purchase request means comprises, a content indicating means for indicating the different kinds of the second information stored in the storage means, and a kind input means for inputting fourth information indicating one of the different kinds;

the charge receiving means receives the charge corresponding to the fourth information; and the information output means reads from the storage means the second information corresponding to the fourth information which is input, and outputs the second information when the charge corresponding to the fourth information is received.

3. An automatic vending machine according to claim 1, further comprising an output information informing means for transmitting output information on the outputting operation of the information output means after the information output means outputs the information.

4. An automatic vending machine according to claim 1, wherein the signal is modulated and scrambled;

the receiving means comprises, a receiving antenna for receiving the signal transmitted from the satellite, a demodulating means for demodulating the modulated and scrambled signal received by the receiving antenna to obtain a scrambled signal, and a descrambling means for descrambling the scrambled signal.

5. An automatic vending machine according to claim 1, further comprising, a receiving antenna for receiving the signal transmitted from the satellite, a box on which the receiving antenna is mounted so that an orientation of the receiving antenna is adjustable, and the box containing components of the automatic vending machine other than the receiving antenna, and a received signal level measuring means for measuring a strength of the received signal.

6. An automatic vending machine according to claim 2, wherein the information output means comprises, a storage medium receiving means for receiving a storage medium which is inserted thereto, a writing means for reading the information requested by the request from the storage means and writing the information to the storage medium received in the storage medium receiving means, and a written storage medium output means for outputting the storage medium after the information is written in the storage medium.

7. An automatic vending machine according to claim 2, wherein the first information includes fifth information accompanying each kind of second information and indicating a version of the kind of second information; and the storage means comprises, a means for determining whether or not a predetermined kind of second information is written in the storage means, a received version reading means for reading the fifth information accompanying the predetermined kind of second information which is newly received by the receiving means when the second and fifth information is newly received, a stored version reading means for reading the fifth information accompanying the predetermined kind of second information which is stored in the storage means, a version comparing means for determining whether or not the version indicated by the fifth information read by the received version reading means is newer than the version indicated by the fifth information read by the stored version reading means, and a rewriting means for rewriting the predetermined kind of second information together with the accompanying fifth information stored in the storage means, with the predetermined kind of second information together with the accompanying fifth information newly received by the receiving means, when the fourth means determined that the version indicated by the fifth information read by the received version reading means is newer than the version indicated by the fifth information read by the stored version reading means.

8. An automatic vending machine according to claim 6, wherein the first information includes fifth information accompanying each kind of second information and indicating a version of the kind of second information; and the information output means further comprises, a means for determining whether or not a predetermined kind of second information is written in the storage medium inserted in the storage medium receiving means when the predetermined kind of second information is requested by the kind input means, a storage medium version reading means for reading the fifth information accompanying the predetermined kind of second information which is written in the storage medium inserted in the storage medium receiving means, a stored version reading means for reading the fifth information accompanying the predetermined kind of second information which is stored in the storage means, a version comparing means for determining whether or not the version indicated by the fifth information read by the storage medium version reading means is older than the version indicated by the fifth information read by the stored version reading means, and a rewriting means for rewriting the predetermined kind of second information together with the accompanying fifth information stored in the storage medium, with the predetermined kind of second information together with the accompanying fifth information stored in the storage means, when the fourth means determines that the version indicated by the fifth information read by the storage medium version reading means is older than the version indicated by the fifth information read by the stored version reading means.

9. An automatic vending machine according to claim 8, wherein the information output means further comprises, a means for indicating a current time, a means for determining whether or not the current time is within a period predetermined for a predetermined kind of second information when the predetermined kind of second information is requested by the kind input means.

10. An automatic vending machine according to claim 1, wherein the information output means comprises, a storage medium stock means for stocking at least one storage medium, an internal storage medium writing means for reading the information requested by the request from the storage means and writing the information in one of the at least one storage medium stocked in the storage medium stock means, and a written storage medium output means for outputting the one of the storage medium after the information is written in the storage medium.

11. An automatic vending machine according to claim 1, wherein the information output means comprises, a storage medium receiving means for receiving a storage medium which is inserted therein, a writing means for reading the information requested by the request from the storage means and writing the information in the storage medium received in the storage medium receiving means, a first written storage medium output means for outputting the storage medium after the information is written in the storage medium, a storage medium stock means for stocking at least one storage medium, an internal storage medium writing means for reading the information requested by the request from the storage means and writing the information in one of the at least one storage medium stocked in the storage medium stock means, and a second written storage medium output means for outputting the one of the storage medium after the information is written in the storage medium; and the purchase request means comprises, a storage medium selecting means for selecting one of the storage medium inserted into the storage medium receiving means and the one of the at least one storage medium stocked in the storage medium stock means, as a storage medium in which the information to be written.

12. An automatic vending machine according to claim 2, further comprising a dealing-allowed information registering means for registering information indicating at least one kind of information which the automatic vending machine is allowed to deal with;

the storage means comprises, a means for determining whether or not the information received by the receiving means is one of the at least one kind of information registered in the dealing-allowed information registering means, and a limited storing means for storing the information received by the receiving means in the storage means when the information received by the receiving means is one of the at least one kind of information registered in the dealing-allowed information registering means.

13. An automatic vending machine according to claim 1, further comprising, an abnormal situation detecting means for detecting an occurrence of an abnormal situation in the automatic vending machine, and an abnormal situation transmitting means for transmitting information on the occurrence of the abnormal situation.

14. An automatic vending machine according to claim 1, wherein the purchase request means comprises, an operation timer means for determining whether or not the operations of receiving the request and the charge are completed within a predetermined time, and an operation stoping means for stopping the operation responding to the request, and initializing the automatic vending machine.

15. An automatic vending machine according to claim 1, further comprising, a box on which the receiving antenna is mounted so that an orientation of the receiving antenna is adjustable, where the box contains components of the automatic vending machine other than the receiving antenna; and a received signal level output means for outputting a signal indicating a strength of the received signal.

16. An automatic vending machine according to claim 1, wherein the charge receiving means comprises, a cash receiving means for receiving payment of the charge by cash, a credit card receiving means for receiving payment of the charge by a credit card, and a prepaid card receiving means for receiving payment of the charge by a prepaid card.

17. An automatic vending machine according to claim 16, wherein the credit card receiving means comprises, a reference communication means for carrying out communication for making a reference regarding validity of the credit card, and an invalidity indicating means for indicating invalidity of the credit card when the reference communication means is informed of the invalidity of the credit card through the communication by the reference communication means.

18. An automatic vending machine according to claim 6, wherein the storage medium receiving means comprises, a storage capacity determining means for determining a vacant capacity of the piece of storage medium inserted in the storage medium receiving means, and a storage capacity indicating means for indicating the determined vacant capacity.

19. An automatic vending machine according to claim 18, wherein the storage medium receiving means comprises: a storage capacity comparing means for determining whether or not the vacant capacity determined by the storage capacity determining means is enough to write all of the information requested by the request; and a capacity shortage indicating means for indicating that the vacant capacity determined by the storage capacity determining means is not enough to write all of the information requested by the request, and prompting an input for requesting to write the information in the inserted piece of storage medium and at least one additional piece of storage medium, or to buy other information to be written in the inserted piece of storage medium, the purchase request means comprises a means for receiving the input for requesting to write the information in the inserted piece of storage medium and at least one additional pieces of piece of storage medium, the information output means comprises a write-in-sections means for writing the requested information into a plurality of pieces of storage medium.

20. An automatic vending machine according to claim 19, wherein the write-in-sections means comprises a storage medium exchange prompting means for prompting for insertion of an additional piece of storage medium into the storage medium receiving means when the storage capacity comparing means determines that the vacant capacity determined by the storage capacity determining means is not enough to write all of the information requested by the request.

21. An automatic vending machine according to claim 6, wherein the storage medium receiving means comprises, a storage medium inlet/outlet for inletting and outletting a piece of storage medium therethrough, a means for drawing the piece of storage medium inward through the storage medium inlet/outlet when the piece of storage medium is inserted into the storage medium inlet/outlet, and a means for pushing the piece of storage medium outward through the storage medium inlet/outlet after the information is written in the piece of storage medium.

22. An automatic vending machine for vending information, comprising:

a signal receiver for receiving a signal carrying first information for sale transmitted from a communication center, said first information including at least one kind of data;

an information storage device for storing the first information;

a purchase order receiver for receiving a purchase order;

attribute information receiver for receiving attribute information which is written on a storage medium, and indicates at least one specific kind of data is allowed to be output; and a storage controller, in response to the purchase order and the attribute information, for specifying and reading the data of said at least one specific kind, from the information storage device and for outputting the data of said at least one specific kind through an output port.

23. An automatic vending machine according to claim 1, wherein said first information contains at least one data block and an information block which indicates which kind of data is contained in said at least one data block.

24. An information delivery and vending system comprising:

a communication center transmitting information for sale to a plurality of automatic vending machines, said information for sale including at least one kind of data;

said plurality of automatic vending machines receiving the information for sale from the communication center;

each of said plurality of automatic vending machines including, receiving means for receiving a signal carrying said information for sale transmitted from the communication center, storage means for storing the information for sale, purchase request input means for receiving a signal indicating a purchase order, attribute information input means for receiving attribute information which is written on a storage medium, and indicates at least one specific kind of data is allowed to be output, information specifying means for specifying and reading the data of said at least one specific kind, from the storage means, and outputting means for outputting the data of said at least one kind through an output port.

* * * * *